(12) United States Patent
Mori et al.

(10) Patent No.: US 7,058,753 B2
(45) Date of Patent: Jun. 6, 2006

(54) SYSTEM AND METHOD FOR ACCESSING AN OFFLINE STORAGE UNIT THROUGH AN ONLINE STORAGE UNIT

(75) Inventors: Akihiro Mori, Odawara (JP); Kiyohisa Miyamoto, Hiratsuka (JP); Masashi Kimura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 10/769,806

(22) Filed: Feb. 3, 2004

(65) Prior Publication Data

US 2004/0260874 A1 Dec. 23, 2004

(30) Foreign Application Priority Data

Jun. 18, 2003 (JP) ............................. 2003-173347

(51) Int. Cl.
*G06F 12/00* (2006.01)
(52) U.S. Cl. .................. 711/100; 711/129; 711/163
(58) Field of Classification Search .................. 707/10, 707/200–204; 711/112, 114, 161, 162; 714/6
See application file for complete search history.

(56) References Cited

U.S. PATENT DOCUMENTS

| | | | | |
|---|---|---|---|---|
| 6,044,444 | A * | 3/2000 | Ofek | ................... 711/162 |
| 6,457,109 | B1 | 9/2002 | Milillo et al. | |
| 6,553,390 | B1 | 4/2003 | Gross et al. | |
| 6,557,079 | B1 | 4/2003 | Mason, Jr. et al. | |
| 6,829,687 | B1 | 12/2004 | Pai | |
| 6,854,034 | B1 * | 2/2005 | Kitamura et al. | ............ 711/112 |
| 2003/0158836 | A1 * | 8/2003 | Venkatesh et al. | ............. 707/1 |
| 2003/0204683 | A1 | 10/2003 | Okumoto et al. | |
| 2004/0024975 | A1 | 2/2004 | Morishita et al. | |
| 2004/0181642 | A1 | 9/2004 | Watanabe et al. | |

FOREIGN PATENT DOCUMENTS

| | | |
|---|---|---|
| JP | 3-127157 | 5/1991 |
| JP | 2000-112666 | 4/2000 |
| JP | 2004-178253 | 6/2004 |

OTHER PUBLICATIONS

ZZYZX Networked Storage Solutions, Zzyzy Peripherals, Inc., Storage solutions by design, http://www.zzyzx.com. Storage Tek, http://www.storagetek.com/products/disks_storage.html.

* cited by examiner

*Primary Examiner*—Donald Sparks
*Assistant Examiner*—Jesse Diller
(74) *Attorney, Agent, or Firm*—Mattingly, Stanger, Malur & Brundidge, P.C.

(57) ABSTRACT

By the same method as that of making data access to a data storage area in an online state, it is performed to access a data storage area other than the data storage area. A plurality of logical volumes carried by a disk array apparatus includes an online volume that is in an online state to a host and an offline state that is in an offline state to the host. The host transmits an access command including target information designating a target volume to the disk array apparatus as an access command to a starting volume other than the target volume. The disk array apparatus receives the access command to the starting volume and offers the data access to the target volume on the basis of the target information carried by that access command to the host.

6 Claims, 13 Drawing Sheets

US 7,058,753 B2

SYSTEM AND METHOD FOR ACCESSING AN OFFLINE STORAGE UNIT THROUGH AN ONLINE STORAGE UNIT

CROSS-REFERENCES TO RELATED APPLICATIONS

This application relates to and claims priority from Japanese Patent Application No. 2003-173347, filed on Jun. 18, 2003, the entire disclosure of which is incorporated herein by reference.

BACKGROUND OF THE INVENTION

1. Field of the Invention

The present invention relates to an art for data access to a data storage area, and particularly relates to, for example, an art for reading the data from a logical volumes that are prepared on many disk storage units arranged in an array or writing the data on that logical volumes.

2. Description of the Related Art

For example, in a database system for the basic industries treating large volume of data, the data is managed by using a storage system that is configured separately from a host computer (hereinafter, simply referred to as a "host"). This storage system is also referred to as a disk array apparatus and this is a RAID (Redundant Array of Independent Inexpensive Disks) that is configured by arranging many disk storage units in an array.

For example, this storage system is as follows:

In other words, this storage system can receive a read/write command from the host, and further, it can hold a virtual disk as a virtual storage area. When receiving a write command from the host, if the virtual disk is defined as a control volume, the storage system may perform mirroring; and if the virtual disk is not defined as a control volume, the storage system may perform the operation for the normal reading or writing (for example, refer to a patent document 1).

[Patent Document 1]

JP-A-2000-112666

By the way, for example, one of the storage systems may prepare a plurality of logical volumes as the virtual storage area; and one of operating systems of the host (hereinafter, referred to as "a host OS") may manage if the logical volume is in the online state or the offline state to each logical volume on the storage system. When the host OS receives a request of writing or reading processing of the data (hereinafter, referred to as "the I/O processing") for a certain or user-desired logical volume (hereinafter, referred to as "a target volume") from an application program of this host (hereinafter, referred to as "a host AP"), the host OS confirms if its target volume is in the online state or not. Then, if it is in the online state, the host transmits the I/O processing request for this target volume to the storage system; and if it is in the offline state, the host OS transmits an error response to the host AP. In other words, the host OS cannot read or write the data from or into the target volume unless the host OS is in the online state to the target volume.

However, a user may sometime want to read or write the data from or into the target volume that is in the offline state.

Specifically, for example, the storage system may perform the duplicating processing (so-called mirroring processing) so as to prevent the system from stopping even if the data is damaged due to a failure of the disk within the storage apparatus. According to such processing, the storage system has two logical volumes, namely, a primary volume and a secondary volume, and when receiving the writing request of the data from the host, the storage system duplicates the data that is requested to be written (hereinafter, referred to as "the write data") and writes the same write data into both of the primary volume and the secondary volume.

In such duplicating processing, the primary and secondary volumes are generally managed in a pair state and they have the same volume label (for example, a volume name). Therefore, the host OS cannot differentiate the primary volume from the secondary volume that are managed in a pair state as a different volume. Thus, in the duplicating processing, one of the logical volumes, for example, the primary volume is in the online state by compulsion, the secondary volume is in the offline state, and the host OS is in the online state only for the primary volume.

However, the user may sometime want to perform the I/O processing for the secondary volume by operating the host AP. In order for this, the user separates the secondary volume from the primary volume by differentiating a volume label of the secondary volume from that of the primary volume, and then, further by restarting the host, so as to make the host OS to recognize the secondary volume. In other words, the user should separate the secondary volume from the primary volume by manual and make the secondary volume into the online state with the host OS.

Thus, in order to read or write the data from or into the logical volume in the offline, the troublesome processing is inevitable for the user.

In addition, for example, even if the user performs the above-described operation, a certain host OS may not be able to make the logical volume that is in the offline state into the online state.

Further, for example, in the duplicating processing, in order to make the secondary volume in the offline state to the host OS into the online state, this secondary volume should be separated from the primary volume. However, when the secondary volume is separated from the primary volume, the duplicating processing is not carried out, so that even if the write data is damaged, it is difficult to address this problem.

The above-described problem is not limited to the logical volume that is the virtual storage area and the physical storage area also involves such a problem.

SUMMARY OF THE INVENTION

Therefore, an object of the present invention is to make it possible by using the same method as the method of having the data access to a physical or logical data storage area that is in the online state to have the data access to the other storage area that is different from the above-described data storage area, for example, a data storage area that is in the offline state to a host. A further object of the present invention will be clear from the descriptions of the embodiment to be described later.

A data access system according to the present invention having a storage system and a host device that is connected to the storage system with allowed for communication thereto; wherein the storage system comprises physical or logical plural data storage areas including an online storage area that is in an online state to the host device; and an access control means enabling the host device to access a target storage area, which is a data storage area other than the online storage area and is a target that the host device wants to access, through the desired or predetermined online storage area.

The "target storage area" in this case may include a data storage area that is in the offline state to the host device or it may include an online storage area other than the foregoing desired online storage area among a plurality of online storage areas for the host device (namely, the other online storage area to which the access request is not issued).

According to this data access system, regardless of whether the target storage area is in the online state or not, it is possible to transmit the access request including the target information indicating the target storage area to the desired online storage area other than the foregoing target storage area. In other words, by using the method of data access to the desired data storage area in the online state, the user can perform the data access to the data storage area other than the foregoing data storage area.

According to a first preferable embodiment, the target storage area is an offline storage area that is in an offline state to the host device. Thereby, by using the method of data access to the desired data storage area in the online state, the user can perform the data access to the desired data storage area in the offline state.

According to a second preferable embodiment, the host device has an access request means for transmitting the access request including target information designating the target storage area to the storage system as the access request to the desired online storage area; and the access control means receives the access request to the desired online storage area from the host device, reads the data from the target storage area on the basis of the target information that is carried by that access request and offers this read data to the host device or the access control means receives the data from the host device and writes this received data in the target storage area.

According to a third preferable embodiment, the access control means may comprise a host communication means as a communication interface to the host device, a storage area communication means for accessing the plural data storage areas, and a cache memory for transferring the read data that is read from the data storage area or the write data that is received from the host device between the host communication means and the storage area communication means. The cache memory secures a cache slot, which is a storage area for temporarily storing the read data or the write data, therein. The cache slot is provided with dedicated to one data storage area. Upon receiving the access request to the desired online storage area from the host device, the host communication means secures a cache slot for target that is dedicated not to the desired online storage area but to a target storage area that is designated by the target information that is carried by the received access request on the cache memory; and thereby, the read data that is read from the target storage area or the write data to be written in the target storage area is temporarily stored in the secured cache slot for target.

According to a fourth preferable embodiment, the access control means may comprise a host communication means as a communication interface for the host device, a storage area communication means for accessing the plural data storage areas, and an access control table for controlling the access to the plural data storage areas. The access control table can record therein the access target information indicating what data storage area accesses, upon receiving the access request from the host device, the host communication means registers the access target information that is designated by the target information that is carried by the received access request as the access target in the access control table; and the storage area communication means reads the data from the target storage area on the basis of the access target that is registered in the access control table so as to transmit this read data from the host communication means to the host device or the storage area communication means writes the write data, which is received by the host communication means from the host device, in the target storage area.

In more detail, for example, the above-described access control means is provided with a plurality of access control tables that are prepared for each of the above-described plural data storage areas. An access address can be recorded in the access control table of each data storage area, and thereby, it is possible to know where in the data storage area the host device should access. When receiving the access request for the desired online storage area from the host device, the host communication means may register the target area identification information for identifying the target storage area that is indicated by the target information carried by the received access request in the access control table of the desired online storage area as the access address, and further, the host communication means may register the target access address as the access address of the target storage area in the access control table of the target storage area on the basis of the target information. The storage area communication means may identify the target storage area from the target area identification information that is registered in the access control table of the desired online storage area to refer to the access control table of that target storage area; and may read the data from the target access address that is registered in that access control table so that the read data is transmitted from the host communication means to the host device. Alternatively, the storage area communication means may write the write data that the host communication means receives from the host device in the target access address.

More in detail, for example, the access control means is further provided with a cache memory for transferring the read data read from the data storage area or the write data received from the host device between the host communication means and the storage area communication means. The cache memory may secure a cache slot as a storage area for temporarily storing the read data or the write data therein. The cache slot is exclusively provided to one data storage area. In the access control table of each data storage area, a cache pointer for specifying the cache slot that is exclusively provided to that data storage area is further recorded. When receiving the access request for the desired online storage area from the host device, the host communication means may secure the cache slot for target not dedicated to the desired online storage area, but dedicated to the target storage area that is indicated by the target information carried by the received access request on the cache memory. Then, the host communication means may also register the cache pointer for target as the cache pointer of the secured cache slot for target in the access control table, and reading the read data from that cache pointer for target, the host communication means may transmit it to the host device or may store the write data from the host device in the cache pointer for target. Referring to the access control table of the target storage area, the storage area communication means may specify an access pointer for target and the cache pointer for the target of the target storage area; it may read the data from the specified access pointer for target; and then, it may store that read data in the specified cache pointer for target. Alternatively, the storage area communication means may read the write data that is stored in the cache pointer for target by the host communication means from the cache pointer for target and write it in the access pointer for target.

According to a fifth preferable embodiment, the access request transmitted by the host device may include a first sub access request and a second sub access request. The first sub access request is the request to the desired online storage area and it includes the target information (further, it may include an access class indicating to which the desired online storage area or the other data storage area, read or write of the data should be carried out). The second sub access request is also the request to the desired online storage area and it includes read/write information indicating which read or write of the data should be carried out, and the access control means performs read/write preparation processing on the basis of the target information by receiving the first sub access request before the second access request, and consequently, the access control means performs read or write of the data to the target storage area that is designated by the target information by receiving the second sub access request.

According to a sixth preferable embodiment, in the third and fifth preferable embodiments, the read/write preparation processing may include securing the cache slot on the cache memory by the host communication means.

According to a seventh preferable embodiment, in the case that the storage system prepares a pair of a primary storage area as a primary logical data storage area and a secondary storage area as a secondary logical data storage area on one or plural physical storage apparatuses, and it performs duplicating processing for writing the data in both of the primary storage area and the secondary storage area, the desired online storage area is the primary storage area and the target storage area (for example, an offline storage area) is the secondary storage area.

Further preferably, for example, if the first data within the primary storage area and the second data within the secondary storage area are not identical with each other, the storage system may have a means for reading the second data from the secondary storage area and writing this second data over the first data within the primary storage area. In this case, for example, the host device may transmit the second data access request, of which access target is the second data of the secondary storage area, to the storage system for the primary storage area, and then, the storage system may read the second data from the secondary storage area on the basis of the second data access request from the host device and may write the read second data over the first data in the primary storage area.

According to an eighth preferable embodiment, in the case that a first host device and a second host device are connected to the storage system with allowed for communication thereto; the target storage area (for example, an offline storage area) for the first host device may include a data storage area that is in the online state to the second host device.

According to a ninth preferable embodiment, in the third preferable embodiment, in the case that a first host device and a second host device are connected to the storage system with allowed for communication thereto, the cache memory prepares an area for a first host as a cache area for a first host device and an area for a second host as a cache area for a second host device; the target storage area (for example, an offline storage area) for the first host device may include a second host online storage area that is in the online state to the second host device; and upon receiving the access request having the target information with the second host online storage area as the target storage area from the first device, the host communication means secures the cache slot for the second host online storage area in the area for the second host on the cache memory.

The storage system according to the present invention may comprise physical or logical plural data storage areas including an online storage area that is in the online state to the host device capable of being connected to the storage system with allowed for communication thereto; and an access control means enabling the host device to access a target storage area, which is a data storage area other than the online storage area and is a target that the host device wants to access, through a desired or a predetermined the online storage area.

Specifically, for example, the storage system is provided with physical or logical plural data storage areas and an access control means for controlling the data access for each data storage area of the host device. When the plural data storage areas include the online storage area in the online state to the host device and the offline storage area in the offline state to the host device, the access control means may receive the access request including the target information indicating the target storage area as the data storage area of the target that the host device wants to access from the host device as the access request for the desired online storage area other than the target storage area, and then, it may read the data from the target storage area on the basis of the target information carried by the access request and may offer it to the host device. Alternatively, the access control means may receive the data from the host device and write it in the target storage area.

The host device according to the present invention is capable of being connected to a storage system having physical or logical plural data storage areas with allowed for communication thereto, wherein, in the case that the plural data storage areas include an online storage area that is in the online state to the host device, the host device may comprise a means for accessing a target storage area, which is a data storage area other than the online storage area and is a target that the host device wants to access, through a desired or a predetermined the online storage area. Specifically, for example, the host device is provided with a request generating means for generating the access request including the target information indicating the target storage area as the data storage area of the target that the host device wants to access as an access request for the desired online storage area other than the target storage area; and an access request means for transmitting the generated access request to the storage system.

According to the preferable embodiment, the host device may further comprise online/offline identification information indicating if each data storage area is in the online state or in the offline state to the host device; a control means for identifying if each data storage area is in the online state or in the offline state on the basis of the online/offline identification information, and the control means performs the access request means when it is in the online state and outputs an error when it is in the offline state; and an information update means for updating the online/offline identification information so as to indicate that the target storage area is in the online state when the target storage area is the offline storage area. In this case, the control means operates on the basis of the online/offline identification information that is updated by the information update means.

According to this embodiment, even if the target storage area is the offline storage area, in the online/offline identification information referred by the control means, that target storage area is updated as the online storage area; and the control means refers to this updated online/offline identification information, so that the control means outputs no error.

In addition, according to this embodiment, for example, even if an OS of the host device does not have the information update means and outputs an error, it is possible to prevent outputting of the error by incorporating the information update means in that OS. Therefore, only by simply changing the design of the OS of the existing host device, the host device can access the offline storage area as same as the data access of the desired online storage area.

In a computer program (or a recording medium recording it) according to the present invention operating as a host device capable of being connected to a storage system having physical or logical plural data storage areas with allowed for communication thereto, in the case that the plural data storage areas include an online storage area that is in the online state to the host device, the computer program makes a computer to carry out a step of accessing a target storage area, which is a data storage area other than the online storage area and is a target that the host device wants to access, through the desired or predetermined online storage area.

A data access system, a storage system, and a host device according to the present invention can be realized by dedicated hardware, the programmed computer, or any combination of them.

DETAILED DESCRIPTION OF THE INVENTION

Figure 1:
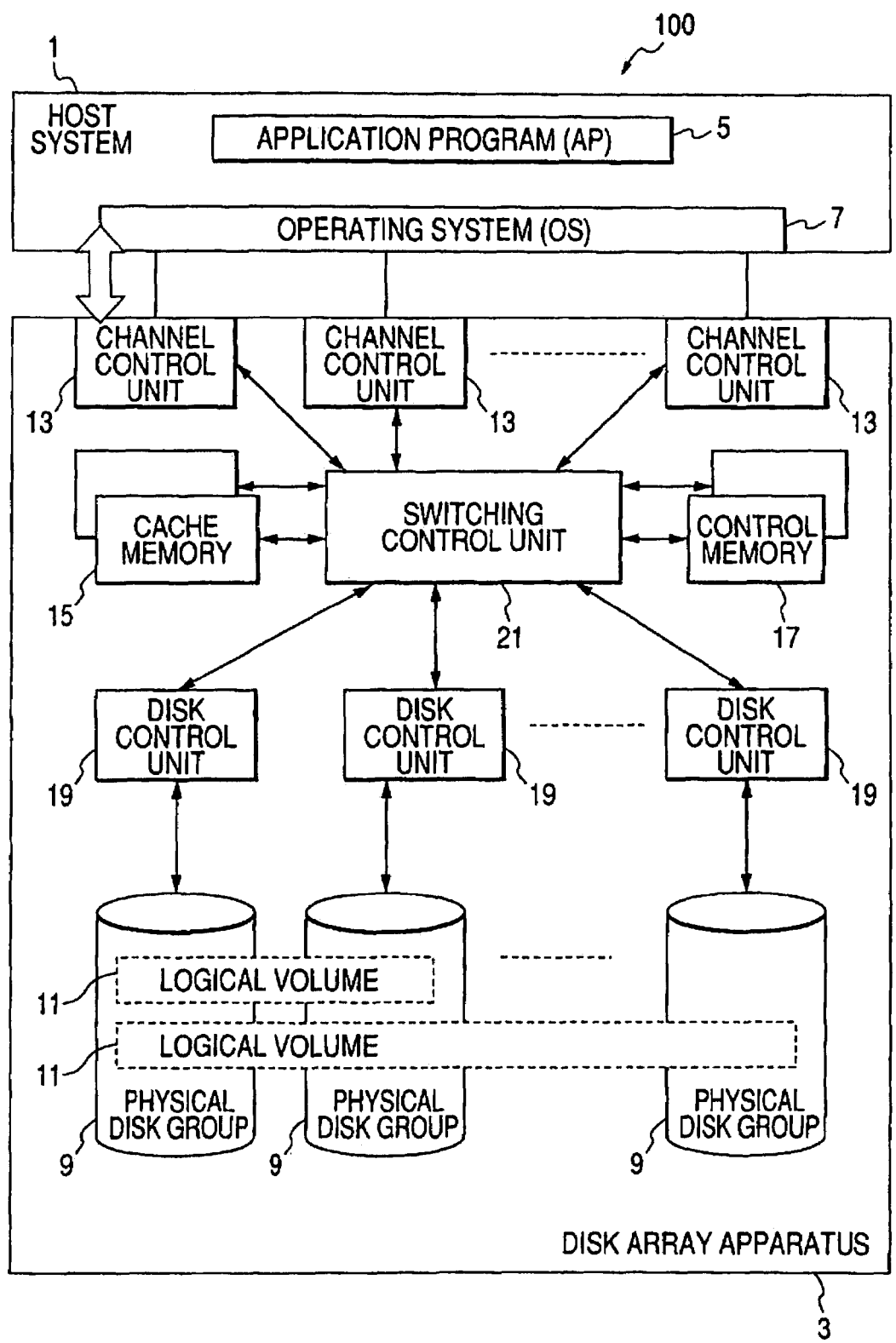
FIG. 1 shows an entire configuration of an access system according to an embodiment of the present invention in a data access system according to resent embodiment.

FIG. 1 shows an entire configuration of an access system according to an embodiment of the present invention.

This access system 100 is provided with a disk array apparatus (for example, a RAID) 3 and a host system (hereinafter, simply referred to "a host") 1 capable of being connected to the disk array apparatus 3 with allowed for communication thereto (a plurality of disk array apparatuses 3 may be connected to one host 1 or a plurality of hosts 1 may be connected to one disk array apparatus 3). The disk array apparatus 3 has one or more physical disk groups 9 having a plurality of disk storage units that are arranged in an array. On a physical storage area offered from these physical disk groups 9, a plurality of logical volumes (logical unit) 11 as a logical storage area is set.

For example, the host 1 may comprise a personal computer and a workstation or the like, and it may comprise a computer system that is provided with a CPU (central processing unit) and a memory or the like. When the CPU of the host 1 performs various programs, various functions are realized. The host 1 is connected to the disk array 3, for example, via a communication network such as a LAN.

As shown in the drawing, this host 1 has one or plural application programs (hereinafter, referred to as "a host AP") 5 and an operating system (hereinafter, referred to as "a host OS") 7.

The host AP 5 may issue a request of writing processing or reading processing of the data (hereinafter, referred to as "an I/O processing") with respect to the logical volume (hereinafter, referred to as "a target volume") 11 that is predetermined or is designated by the user to the host OS 7.

In response to the I/O processing request from the host AP 5, the host OS 7 may confirm whether the target volume 11 is in the online state or not. Then, the host OS 7 may generate a data writing/reading command (hereinafter, referred to as "an access command") having content in accordance with the result and may transmit this command to the disk array apparatus 3.

The disk array apparatus 3 is provided with one or plural channel control units 13, a cache memory 15, a control memory 17, one or more physical disk groups 9, one or more disk control units 19, and a switching control unit 21.

One or plural channel control units 13 may be connected to one or plural hosts 1 with allowed for communication thereto. Each channel control unit 13 may be composed of a hardware circuit, software, or a combination thereof to engage data communication between this disk array apparatus 3 and the host 1 that is connected thereto. Each channel control unit 13 has a communication interface for engaging communication with the host 1 that is connected thereto, and it further has a command processor function for interpreting and processing various commands that are received from the host 1. With reference to the information that is registered in a control memory 17, each channel control unit 13 may read the data that is stored in a cache memory 15 and may transmit it to the host 1, or each channel control unit 13 may store the data received from the host 1 (hereinafter, referred to as "write data") as a target of writing in the cache memory 15.

The cache memory 15 is a memory shared by each channel control unit 13 and each disk control unit 19. In the cache memory 15, one or plural virtual storage areas (hereinafter, referred to as "a cache slot") can be set by each channel control unit 13. The cache slot is set with respect to a certain one logical volume. Specifically, in the cache slot, the data to be written in the logical volume corresponding to that cache slot, or the data read from that logical volume may be temporally stored.

The control memory 17 is also a memory shared by each channel control unit 13 and each disk control unit 19. In the control memory 17, a control table (not illustrated) is prepared for each logical volume 11 that is prepared on one or more physical disk groups 9, and in each control table, certain various information to be described later is stored. The data reading and data writing from or into the cache slot on the cache memory 15 and each logical volume 11 may be carried out on the basis of certain information recorded in the control table corresponding to that logical volume.

Each physical disk group 9 is configured by arranging a plurality of disk storage units in an array. As a disk storage unit composing the physical disk group 9, for example, various devices such as a hard disk unit, a flexible disk unit, and a semiconductor storage unit can be used. On the physical storage area that is offered by one or more physical disk group 9, as described above, a plurality of logical volumes 11 as the logical storage area is set.

Each disk control unit 19 is provided for each physical disk group 9 to control that certain physical disk group 9. For example, the disk control unit 19 may read or write the data from or into the target volume 11 on one or more physical disk groups 9 on the basis of the control table of the target volume 11 on the control memory 17. In addition, the disk control unit 19 may convert the data access request for the logical volume 11 into the data access request for the physical disk by converting the logical address into a physical address.

A switching control unit 21 can be configured, for example, as a high-speed bus such as an ultra high-speed crossbar switch for performing the data transmission by the high-speed switching operation. The switching control unit 21 may connect each channel control unit 13, each disk control unit 19, the control memory 17, and the cache memory 15 as allowing them to communicate with each other. Transfer of the data and the command between these respective channel control units 13, respective disk control units 19, the control memory 17, and the cache memory 15 is carries out through the switching control unit 21.

A brief summary of the access system 100 according to this embodiment is as described above. In this access system 100, for example, each disk control unit 19 may be directly connected to each physical disk group 9, or each disk control unit 19 may be indirectly connected to each physical disk group 9 via a network. In addition, the physical disk group 9 and the disk control unit 19 may be integrally formed. Further, one logical volume 11 may be assigned to each channel control unit 13, or one logical volume 11 may be shared by a plurality of channel control units 13.

By the way, the access system 100 according to the present embodiment will be described more in detail below.

At first, an access command to be issued by the host 1 to the disk array apparatus 3 will be described.

Figure 2:
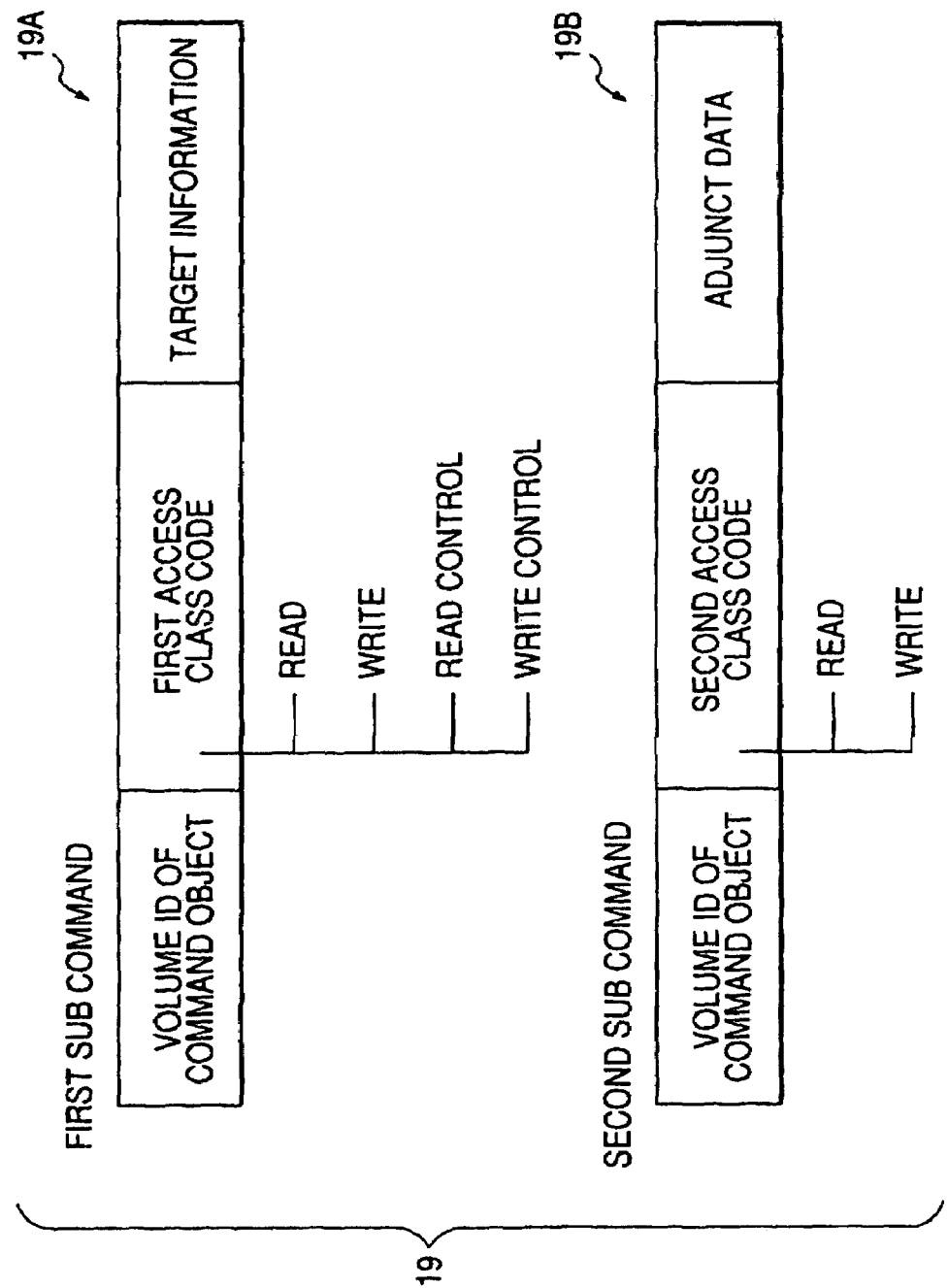
FIG. 2 shows an access command issued by a host 1.

FIG. 2 shows an access command issued by the host 1.

An access command 19 to be issued by the host 1 to the disk array apparatus 3 includes a first sub command 19A and a second sub command 19B.

The first sub command 19A is a packet to be transmitted from the host 1 to the disk array apparatus 3 prior to the second sub command 19B (for example, at first). This sub command 19A includes a command target volume ID, a first access class code, and the target information.

The "command target volume ID" is an identification code of the logical volume, to which the access command 19 is issued, and in this embodiment, the command target volume ID is definitely an ID of a starting volume. The "starting volume" is an online volume that is selected from among one or plural logical volumes (hereinafter, referred to as "an online volume") that are in the online state with respect to the host 1 by the host 1, and this is an issue destination of the access command 19 (the starting volume may be automatically selected by the host 1 or the disk array apparatus 3 on the basis of a certain rule, or the user may arbitrarily select the starting volume).

The "first access class code" is a code indicating what class of access the host 1 wants to have. The first access class has four classes, namely, read, write, read control and write control (the first access class is not limited to four classes). If the first access class code includes a code indicating "read", this means that the data is read from the starting volume. In the same way, if the first access class code includes a code indicating "write", this means that the data is written into the starting volume. On the other hand, if the first access class includes a code indicating "read control", this means that the data is read from a logical volume other than the starting volume (for example, an online volume other than the starting volume, or an offline volume as the logical volume in the offline state with respect to the host 1). In addition, if the first access class includes a code indicating "write control", this means that the data is written into a logical volume other than the starting volume.

The "target information" is the information for the logical volume having the data that the host 1 wants to read or the logical volume having the data that the host 1 wants to write (namely, the target volume). Specifically, for example, if the access class code is a code indicating read or write in the first sub command 19A, the target information may include an address indicating an access destination, namely, indicating what part of the starting volume the host device should access (hereinafter, referred to as "an access address"). On the other hand, if the access class code is a code indicating read control or write control in the first sub command 19A, the target information may include a volume ID of a logical volume other than the starting volume, and an access address indicating an access destination, namely, indicating what part of the logical volume the host device should access.

The second sub command 19B is a packet to be transmitted from the host 1 to the disk array apparatus 3 at certain timing after the first sub command 19A is transmitted from the host 1 to the disk array apparatus 3. This sub command 19B may include a command target volume ID, a second access class code, and the adjunct data.

The "command target volume ID" is identical with the command target volume ID that is included in the first sub command 19A. In other words, since a command target of the access command 19 is the starting volume regardless of whether the host 1 wants to access the starting volume or the other logical volume (in other words, the target volume is the starting volume or the other logical volume), as same as the first sub command 19A, the command target volume ID of this sub command 19B is the ID of the starting volume.

The "second access class code" is a code indicating any of read and write unlike in the case of the first access class code. In other words, if this second access class code includes a code indicating "read", this means that the data is read from a target volume capable of being specified from the target information of the first sub command 19A (in other words, the starting volume or the logical volume other than the starting volume). In the same way, if the second sub command 19B includes a code indicating "write" as the access class code, this means that the data is written into this target volume.

The "adjunct data" is the data that is attached to the second sub command 19B. Specifically, for example, the adjunct data may include the write data that the host 1 wants to write into the target volume if the second access class code is a code indicating write. On the other hand, if the second access class code is a code indicating read, the adjunct data may include the null data in place of the write data.

The access command that the host 1 issues to the disk array apparatus 3 is as described above (a flow of transmitting the first and second sub commands 19A and 19B by the host 1 and a flow of the operation of the disk array apparatus 3 on the basis of these first and second sub commands 19A and 19B will be described later).

In the next place, a control table that is prepared on the control memory 17 carried by the disk array apparatus 3 will be described below.

Figure 3:
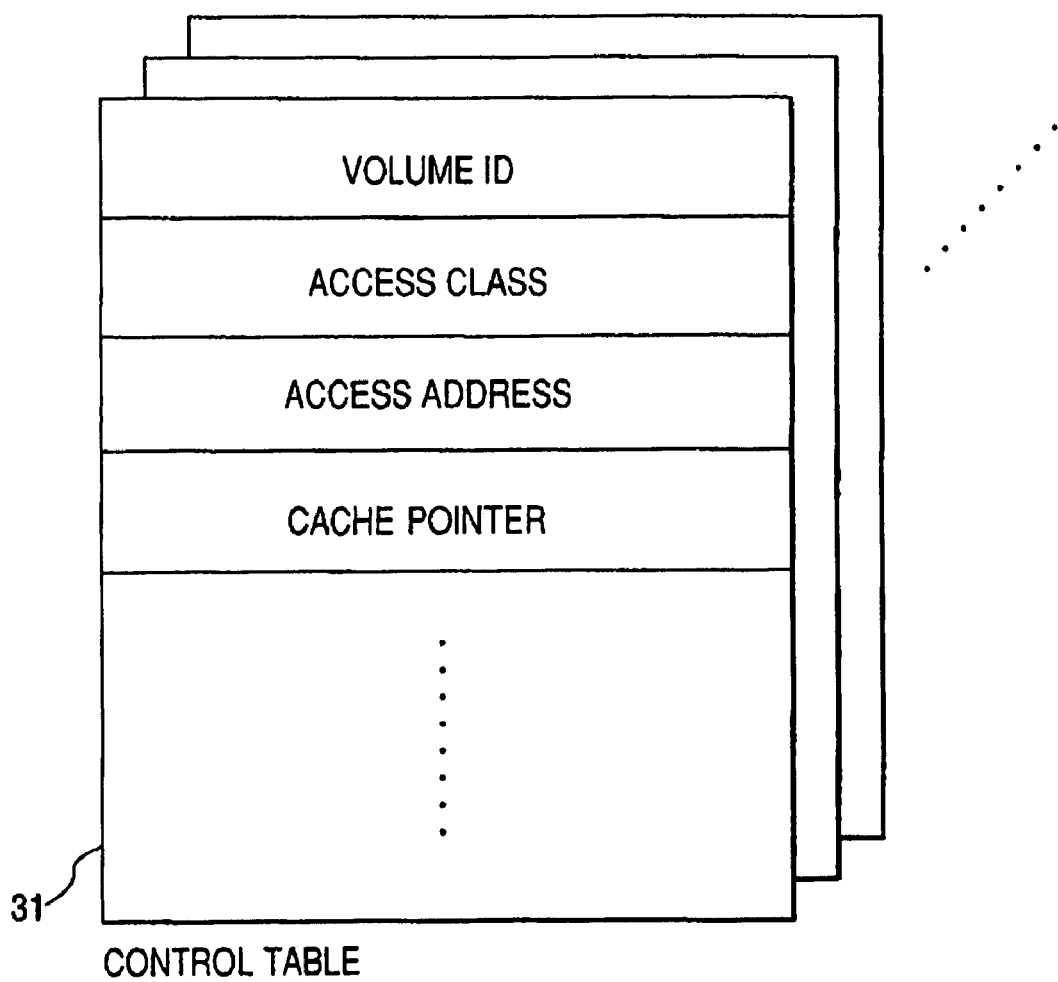
FIG. 3 shows a control table prepared in a control memory 17.

FIG. 3 shows a control table prepared in the control memory 17.

As described above, a control table 31 is prepared for each logical volume 11. In each control table 31, a volume ID, an access class, the access target information, and a cache pointer or the like are recorded.

The "volume ID" is an ID of the corresponding logical volume. Each channel control unit 13 and each disk control unit 19 can recognize what control table 31 corresponds to what logical volume 11 with reference to this volume ID.

The "access class" indicates what class of access is done for the corresponding logical volume. Specifically, for example, if the target volume is the starting volume, read or write is registered in the control table 31 of the starting volume as access class. On the other hand, if the target volume is the logical volume other than the starting volume (hereinafter, abbreviated to as "an other volume"), read control or write control is registered on the control table 31 of the starting volume as the access class, and read or write is registered on the control table 31 of the other volume as the access class.

The "access address" is an address of an access destination (for example, a logical address) indicating what part of the corresponding logical volume the host device should access.

The "cache pointer" is the information indicating the cache slot prepared exclusively on the cache memory 15 to the corresponding starting volume. With reference to the cache pointer that is registered on each control table 31, each channel control unit 13 and each disk control unit 19 can identify in what cache slot the data read from the logical volume 11 corresponding to that control table 31 or the data to be written in that logical volume 11 is stored.

The control table 31 is as described above.

In the next place, in the data access system according to the present embodiment a flow of the operation when the host 1 targets a logical volume other than the starting volume and reads the data therefrom will be briefly explained below. In the following explanation, the target volume is defined as an offline volume in the offline state with respect to the host 1.

Figure 4:
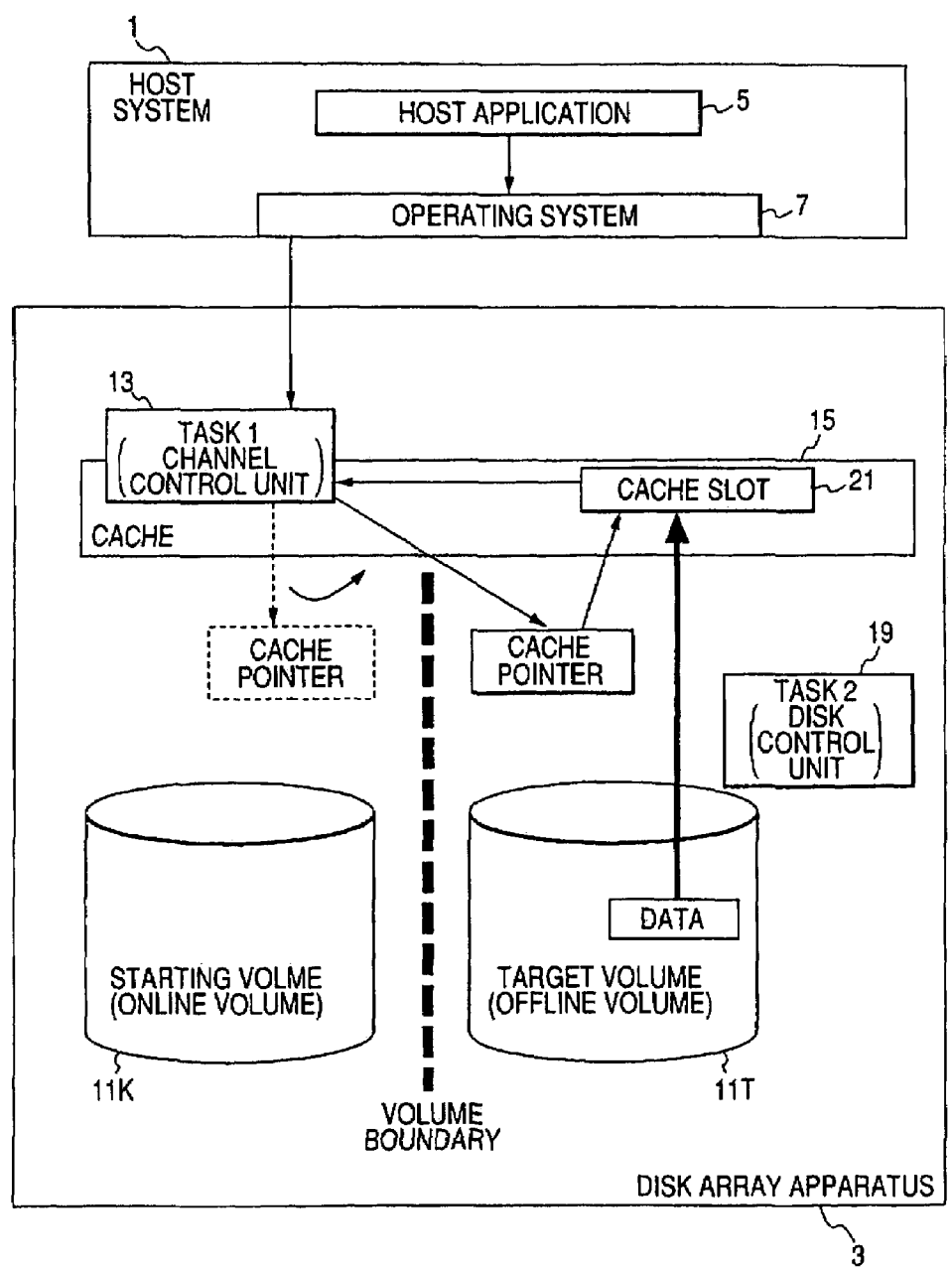
FIG. 4 shows a flow of the operation when the host 1 targets a logical volume other than a starting volume and reads the data therefrom in a data access system according to present embodiment.

FIG. 4 shows a flow of the operation when the host 1 targets a logical volume other than a starting volume and reads the data therefrom in the data access system according to the present embodiment.

The host AP 5 may issue an I/O processing request of reading the predetermined or user-designated data from an offline volume (namely, "a target volume") 11T that is predetermined or is designated by the user to the host OS 7.

In response to the I/O processing request from the host AP 5, the host OS 7 may generate an access command 19 having the target information designating the offline volume 11 and may transmit it to the disk array apparatus 3 as a command for a starting volume 11K.

The channel control unit 13 that is connected to the host 1 with allowed for communication thereto may receive the access command 19 for the starting volume 11K from the host 1 and may analyze the first access class code included in that access command 19. As a result, if that first access class code means read control reading the data form the logical volume other than the starting volume, the channel control unit 13 may operate as follows.

In other words, the channel control unit 13 secures a cache slot 21 on the cache memory 15. In this time, even if an access command 19 is for the starting volume 11, since the target is the offline volume 11T, the channel control unit 13 secures the cache slot 21 not for the starting volume 11K but for the offline volume 11T. Then, the channel control unit 13 may register the cache point of the cache slot 21 that is secured for the offline volume 11T in a control table 31T of the offline volume 11T that can be specified from the target information included in the access command 19 (it does not register the cache pointer in the starting control table 31K of the starting volume 11K). In addition, the channel control unit 13 may register the access address of the offline volume 11T that can be specified from the target information included in the access command 19 in the control table 31T.

For example, each disk control unit 19 knows an ID of the logical volume 11 that is prepared on the physical disk group 9, to which this disk control unit 19 itself is connected, and it constantly monitors the control table of that logical volume 11 (hereinafter, referred to as "a target control table"). As a result, if the cache pointer, the access address, and the access class or the like are newly registered in the target control table, each disk control unit 19 may perform the processing in accordance with that access class.

In other words, according to this example shown in FIG. 4, detecting that the cache pointer and the access address or the like are newly registered in the target control table 31T, the disk control unit (hereinafter, referred to as "a responsible disk control unit") 19 corresponding to the physical disk group 9 having prepared the offline volume 11T therein may read the data from that access address (namely, the address in the offline volume 11T) and may store the read data in the cache slot 21 that can be identified from the cache pointer registered in the control table 31T.

Detecting that the read data is stored in the cache slot 21 by a certain method (for example, a method for monitoring the above-described secured cache slot 21), the channel control unit 13 may read that read data from the cache slot 21 and may transmit it to the host 1.

Due to such a flow, the host 1 can read the data from the logical volume (for example, the offline volume 11T) other than the starting volume 11K even if the access command 19 for the starting volume 11K is transmitted to the disk array apparatus 3.

The operations of the host 1 and the disk array apparatus 3 will be described in detail later and they are not described in detail here, however, according to the above description with reference to FIG. 4, it is possible to also understand the operation in the case of writing the data in the other volume.

In other words, the channel control unit 13 may secure the cache slot 21 for the target volume 11T, may register the cache slot thereof in the control table 31T, and may store the write data from the host 1 in that cache slot 21. The responsible disk control unit 19 may identify the cache slot 21 having the write data from the cache pointer that is registered in the control table 31T, may read the write data from that cache slot 21, and may write that write data in the access address that is registered in the control table 31T.

This will be described more in the abstract below. For example, the disk array apparatus 3 enables the host 1 to have access to the target volume 11T that is the logical volume other than the desired or predetermined online volume (namely, the starting volume) 11K and is a target that the host 1 wants to access via that online volume 11K. From another point of view, for example, the host 1 may access the target volume 11T as the logical volume other than the desired or predetermined online volume 11K from among a plurality of the logical volumes carried by the disk array apparatus 3 via that online volume 11K.

By the way, the operations of the host 1 and the disk array apparatus 3 will be described in detail below.

Figure 5:
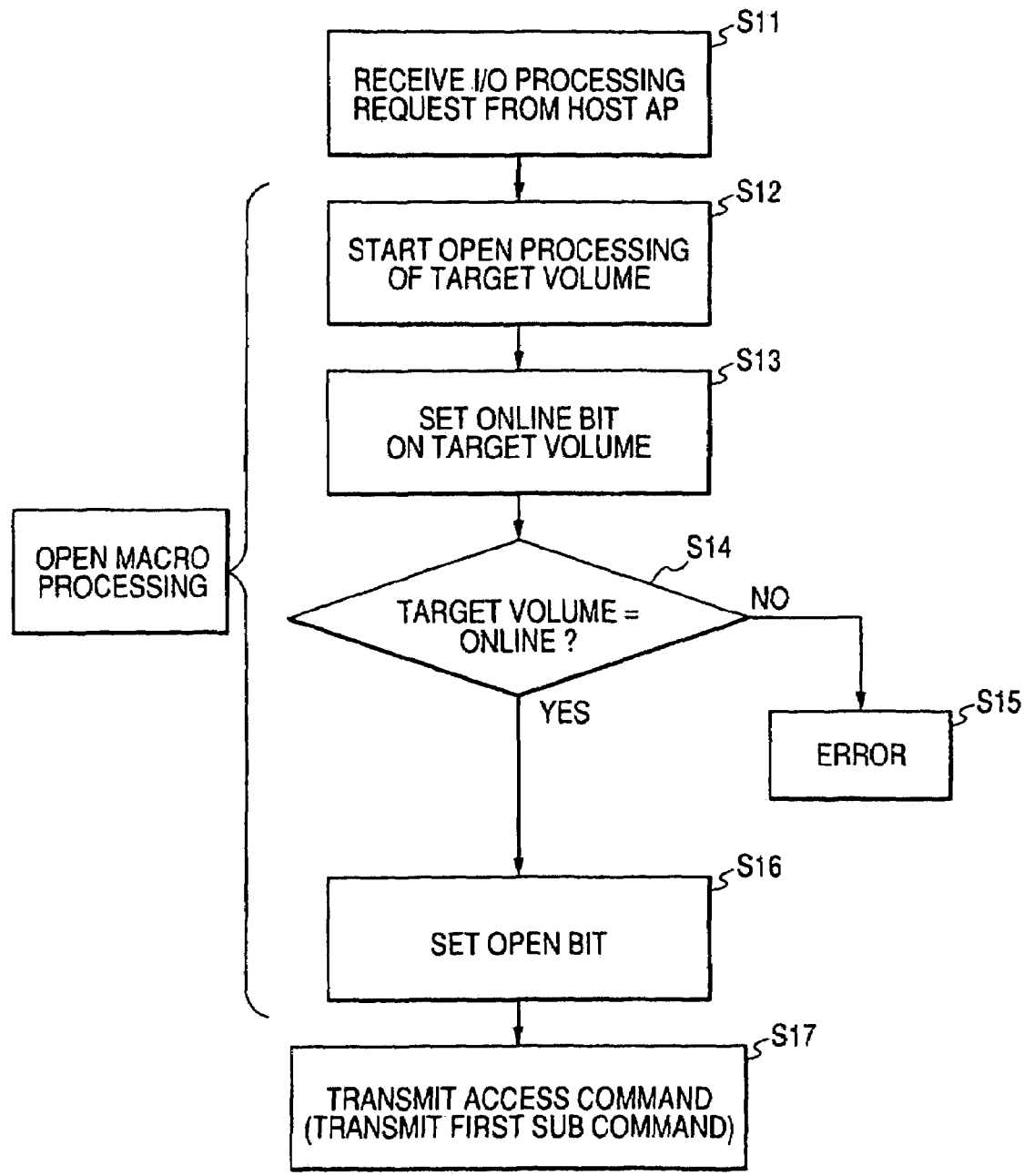
FIG. 5 shows a flow of the operation of a host OS 7.

FIG. 5 shows a flow of the operation of the host OS 7.

At first, before explaining the operation, two kinds of information managed by the host OS 7 will be described below.

The host OS 7 manages an online bit and an open bit for each logical volume 11.

The "online bit" informs whether the corresponding logical volume is in the online state to the host 1 or not. If this online bit is set (for example, "1"), this shows that the corresponding logical volume is in the online state; and if it is not set (for example, "0"), this shows that the corresponding logical volume is in the offline state. The host OS 7 may monitor if each logical volume is in the online state or the offline state at arbitrary timing; and in accordance with this monitoring result, the host OS 7 may set the online bit of each logical volume or may unset the set online bit (for example, turn "1" into "0").

The "open bit" informs the host OS 7 whether or not the host AP other than the host AP5 requesting the I/O processing (not illustrated) should not access the corresponding logical volume. If this open bit is set (for example, "1"), this informs the host OS 7 that the host AP other than the host AP5 requesting the I/O processing (not illustrated) should not access the corresponding logical volume (namely, it informs that exclusion processing has been performed); if it is not set (for example, "0"), this informs the host OS 7 that any host AP 5 may access that logical volume (namely, it informs that the exclusion processing is not performed).

In the next place, a flow of the operation of the host OS 7 managing such online bit and open bit will be described below.

The host OS 7 may receive the I/O processing request to perform the I/O processing together with a notice of the target volume 11T to that target volume 11T from the host AP5 (step S11).

The host OS 7 may start the open processing for the target volume 11 in response to the I/O processing request from the host AP5 (S12). This "open processing" is the exclusion processing to prevent the other host AP (not illustrated) from accessing the target volume 11T.

At first, the host OS 7 may set the online bit of the target volume 11T whether or not the online bit is set in the target volume 11T (S13).

In the next place, the host OS 7 confirms if the online bit is set in the target volume 11T (S14). In this case, the host OS 7 may detect that the online bit is set since the online bit is set at S13 (YES at S14); and the host OS 7 may set the open bit for that target volume 11T (S16). Then, the host OS 7 may generate an access command 19 (in a narrow sense, the first sub command 19A at this stage) having the target volume 11T as the starting volume 11K or having an online volume other than the target volume 11T as the starting volume 11K and may transmit it to the disk array apparatus 3.

The flow of the operation of the host OS 7 is as described above.

Detecting that the online bit is not set as a result of S14 in the above-described flow (NO at S14), the target volume 11T is an offline volume and the host OS 7 may inform the host AP 5 of an error (S15). However, before the above-described device, namely, the processing of confirming if the online bit is set in the target volume 11T (the processing at S14), the device of performing the processing of setting the online bit of the target volume 11T (the processing at S13) is provided to the host OS 7 regardless of whether or not the online bit is set in the target volume 11T. Thereby, even if the target volume 11T is an offline volume, the error is not informed from the host OS 7 to the host AP 5; and as same as the case that the target volume 11T is an online volume, the access command 19 is transmitted from the host OS 7 to the disk array apparatus 3.

In addition, the above described processing from S12 to S16 may be carried out by macro. Accordingly, before the processing at S14, if a macro for performing the processing of setting the online bit of the target volume 11T by compulsion (the processing at S13) regardless of whether or not the online bit is set in the target volume 11T is loaded in the host OS 7, the host OS 7 is capable of performing the above-described operation shown in FIG. 5. In addition, even if the macro that has been already loaded in the host OS 7 performs the processing at S14 without performing the processing at S13 after the processing at S12, by inserting the processing at S13 between the processing at S12 and that at S14, it is possible to change the macro into a macro capable of performing the above-described operations at S12 to S16.

In addition, the processing shown in FIG. 5 may be carried out only when the target volume 11T is an offline volume. Specifically, for example, the host OS 7 confirms if the online bit is set in the target volume 11T primarily in the S12. As a result, the host OS 7 may perform the processing at S13 only when the online bit is not set; and may omit the processing at S13 and perform the processing at S14 (the processing checking if the online bit is set in the target volume 11T secondarily) when the online bit has been already set (namely, when the target volume 11T is an online volume).

In addition, the host OS 7 can generate and transmit the second sub command 19B at arbitrary timing (for example, when receiving a response of a certain content from the disk array apparatus 3) after transmitting the first sub command 19A (not illustrated). Specifically, for example, if the first access class code included in the transmitted first sub command 19A is a code indicating read or read control, the host OS 7 generates and transmits the second sub command 19B having the second access class code indicating read; and on the other hand, if the above-described first access class code is a code indicating write or write control, the host OS 7 generates and transmits the second sub command 19B having the second access class code indicating write.

Figure 6:
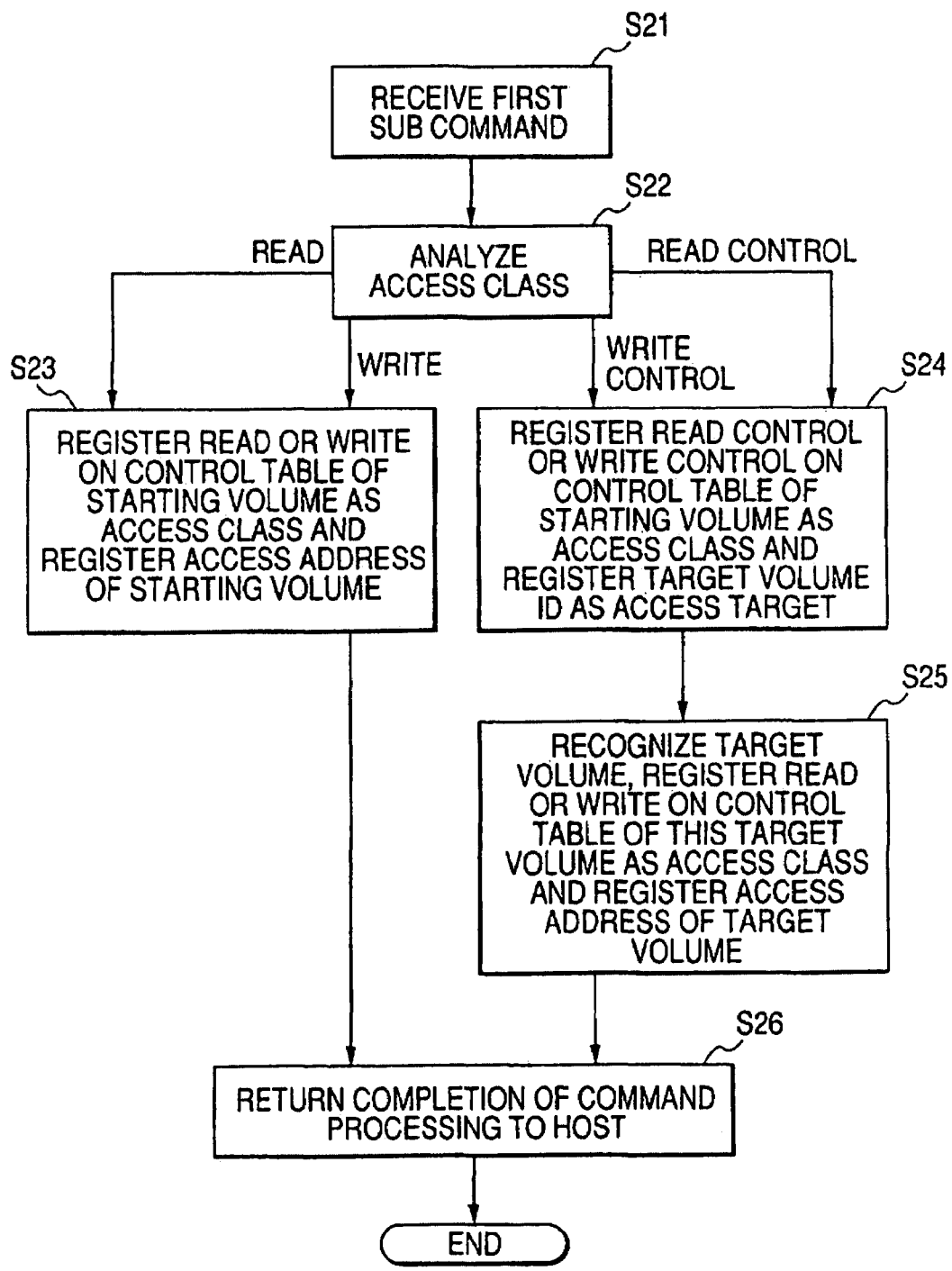
FIG. 6 shows a flow of the operation of a disk array apparatus 3 when receiving a first sub command 19A from the host 1.

FIGS. 6 to 10 show a flow of the operation of the disk array apparatus 3. Specifically, FIG. 6 shows a flow of the operation of the disk array apparatus 3 when receiving the first sub command 19A from the host 1; and FIGS. 7 to 10 show a flow of the operation of the disk array apparatus 3 when receiving the second sub command 19B from the host 1.

At first, with reference to FIG. 6, the operation flow of the disk array apparatus 3 when receiving the first sub command 19A from the host 1 will be described below.

As shown in FIG. 6, when receiving the first sub command 19A from the host 1 (S21), the channel control unit 13 of the disk array apparatus 3 may specify the starting volume 11K from the command target volume ID included in that first sub command 19A and at the same time, it may analyze the first access class code included in that first sub command 19A (S22).

As a result of S22, if the first access class code indicates read or write, this means that the target is the starting volume 11K, so that the channel control unit 13 may register read or write as the access class in a control table (hereinafter, referred to as "a starting control table") 31K having an ID of the above-described specified starting volume 11K; and may register the access address of the starting volume 11K (S23). Then, the channel control unit 13 may return a response of completion of command processing representing that the processing for the first sub command 19A has been finished to the host 1 (S26).

On the other hand, as a result of S22, if the first access class code indicates read control or write control, this means that the target is the volume 11T other than the starting volume 11K (for example, an offline volume), so that the channel control unit 13 may register read control or write control as the access class in the starting control table 31K; and it may register the volume ID of the target volume 11T indicated by the target information that is included in the received sub command 11A in the starting control table 31K (S24). In addition, the channel control unit 13 may register read or write as the access class in a control table (hereinafter, referred to as "a target control table") 31T of the target volume 11T; and it may register the access address of the target volume 11T (S25). If these processings are finished, the channel control unit 13 may return a response of completion of the above-described command processing to the host 1 (S26).

Receiving the response of completion of command processing from the channel control unit 13, the host OS 7 may generate and transmit the second sub command 19B. As described above, the second access class code included in the sub command 19B to be transmitted in this time is a code indicating read when the first access class code included in the first sub command 19A is a code indicating read or read control; and it is a code indicating write when the above-described first access class code is a code indicating write or write control.

In the next place, with reference to FIGS. 7 to 10, the operation flow of the disk array apparatus 3 when receiving the second sub command 19B from the host 1 will be described below. In order to make the explanation understandable, this operation flow is divided into the following four cases:

(1) A case of reading the data from the starting volume 11K (in other words, a case that the first access class code carried by the first sub command 19A that is received precedently indicates read; hereinafter, referred to as "a normal read case")

(2) A case of reading the data from the volume 11T other than the starting volume 11K (in other words, a case that the first access class code carried by the first sub command 19A that is received precedently indicates read control; hereinafter, referred to as "a read control case")

(3) A case of writing the data from the volume 11T other than the starting volume 11K (in other words, a case that the first access class code carried by the first sub command 19A that is received precedently indicates write control; hereinafter, referred to as "a write control case")

(4) A case of writing the data into the starting volume 11K (in other words, a case that the first access class code carried by the first sub command 19A that is received precedently indicates write; hereinafter, referred to as "a normal write case")

(1) A Normal Read Case

Figure 7:
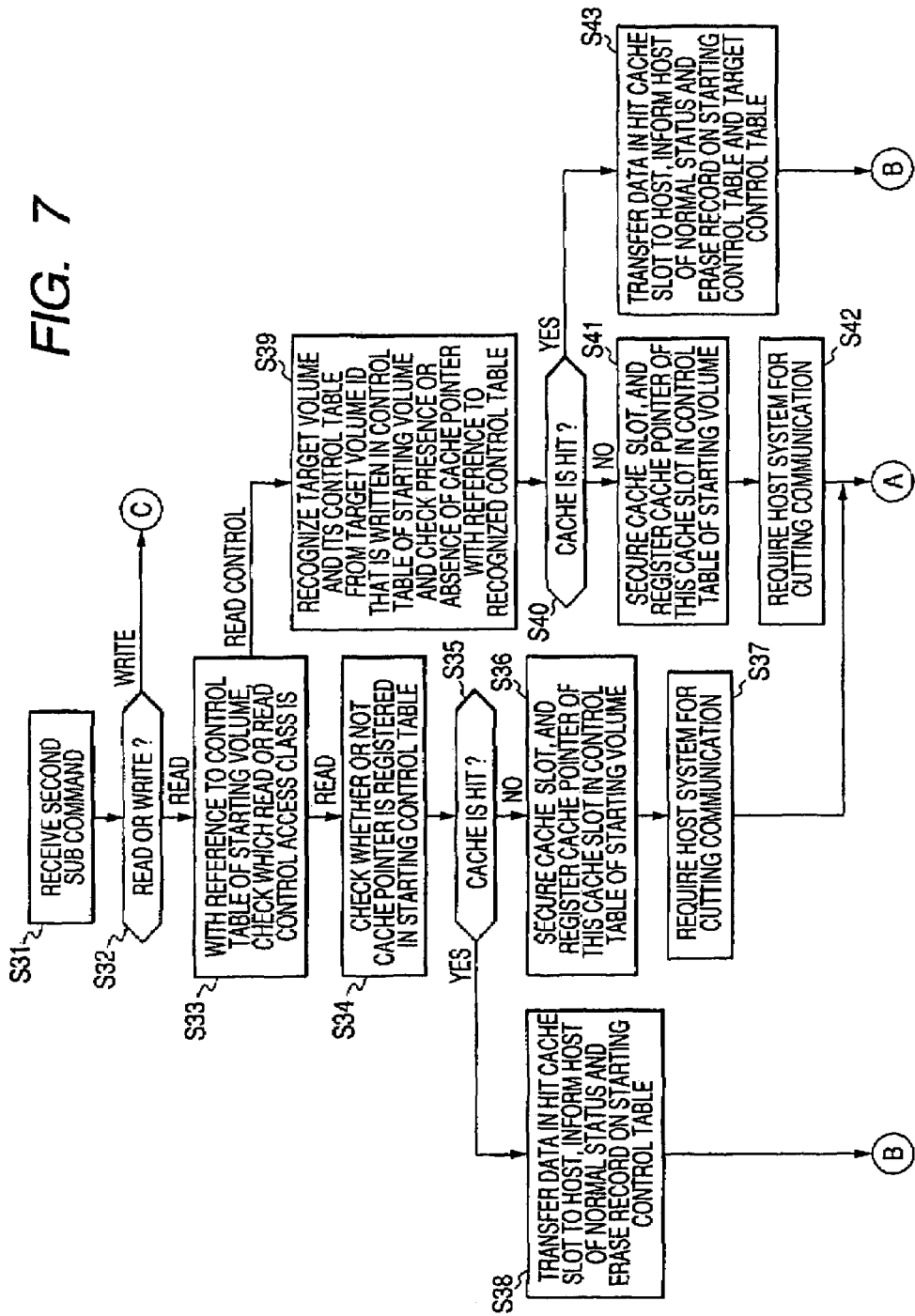
FIG. 7 shows a flow of the operation of the disk array apparatus 3 when receiving a second sub command 19B from the host 1.

As shown in FIG. 7, receiving the second sub command 19B from the host 1 (S31), the channel control unit 13 may specify the starting volume 11K from the command target volume ID included in that second sub command 19B and at the same time, it may analyze the second access class code included in that second sub command 19B (S32).

As a result of S32, the channel control unit 13 may check which read or read control is registered as the access class with reference to the starting control table 31K of the starting volume 11K as a target of the second sub command 19B when the second access class code indicates read (S33).

As a result of S33, if read is registered, the channel control unit 13 may confirm whether or not the cache pointer is registered in the starting control table 31K (hereinafter, referred to as "whether or not cache is hit")(S34).

As a result of S34, if the cache is not hit (N at S35), the channel control unit 13 may secure the cache slot 21 dedicated to the starting volume 11K on the cache memory 15; and may register the cache pointer of that cache slot 21 in the starting control table 31K (S36). After that, the channel control unit 13 may require the host 1 for cutting the communication (specifically, for example, it requests the host 1 to cut a certain communication channel among a plurality of communication channels)(S37). Thereby, communication between the host 1 and the disk array apparatus 3 is cut by the host 1.

Figure 8:
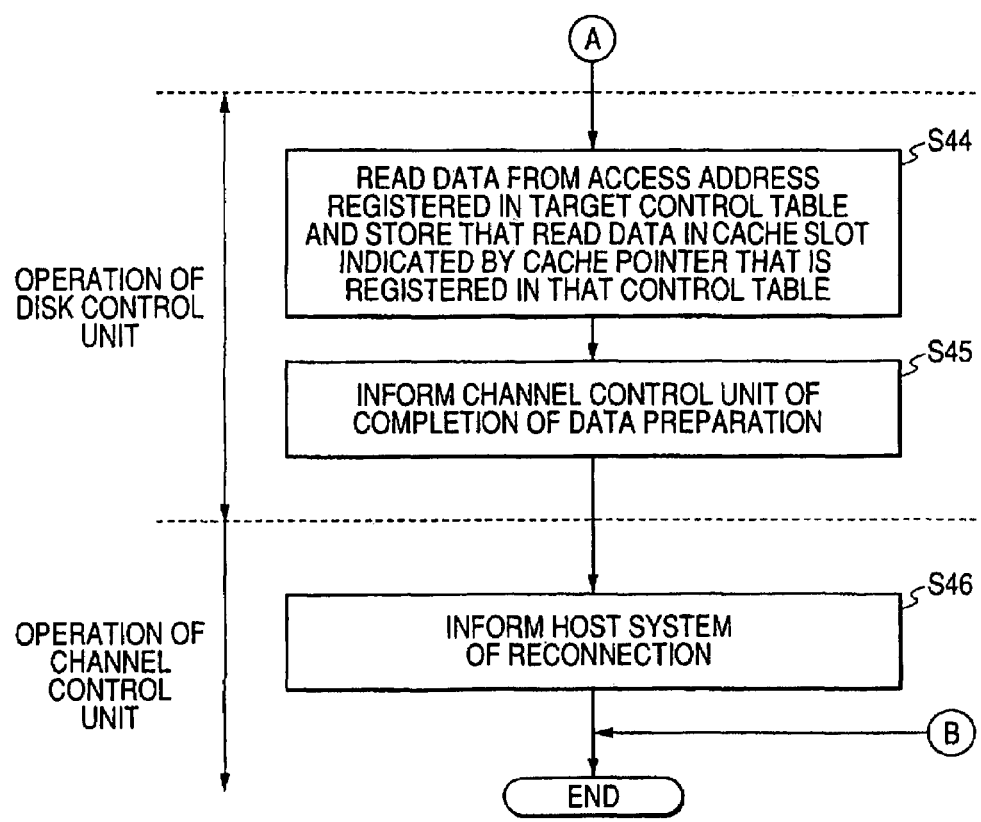
FIG. 8 shows a flow of the operation of the disk array apparatus 3 when receiving the second sub command 19B from the host 1.

As shown in FIG. 8, after S37, if the disk control unit 19 corresponding to the physical disk group 9 having the starting volume 11K prepared therein detects that the cache pointer or the like is newly registered in the starting control table 31K, this disk control unit 19 may read the data from the access address (namely, the access address of the starting volume 11K) registered in that starting control table 31K; and then, it may store that read data in the cache slot 21 indicated by the cache pointer that is registered in the starting control table 31K (S44). Then, the disk control unit 19 may inform the channel control unit 13 of completion of data preparation meaning that the read data is stored in the cache slot 21 of the starting volume 11K (S45). Further, assuming that the channel control unit 13 registers an identification code of itself together with the cache pointer or the like in the starting control table 31K, the disk control unit 19 can identify the channel control unit 13 to which the above-described completion of data preparation is informed from that identification code.

Upon receiving a notice of completion of data preparation from the disk control unit 19, the channel control unit 13 may request the host 1 that is requested to cut the certain communication channel at S37 in FIG. 7 for reconnection (S46).

Upon receiving request of reconnection from the channel control unit 13, the host OS 7 may reconnect to the disk array apparatus 3 (for example, it may form the certain communication channel that was cut) and may transmit again the second sub command 19B that was transmitted in advance. Therefore, the above-described processing from S31 to S34 shown in FIG. 7 may be carried out.

Since the cache pointer is registered in the starting control table 31K at S36, in this time, the cache is hit at S34 (Y at S35). In this case, the channel control unit 13 may read the above-described stored read data from a cache slot 21 that is cache-hit (namely, the cache slot 21 indicated by the cache pointer registered in the starting control table 31K) and transmit it to the host 1. Further, the channel control unit 13 may inform the host 1 of normal status indicating that the read processing is normally carried out and may erase record on the starting control table 31K (for example, a cache pointer, an access address, and an access class or the like) (S38).

The flow of the normal read is as described above.

(2) A Read Control Case (Namely, a Case of Reading the Data from the Volume 11T Other than the Starting Volume 11K)

In this case, at first, as shown in FIG. 7, as same as the normal read case, the processing from S31 to S33 may be carried out. Then, in this case, as a result of S33, it is detected that the he read control is registered in the starting control table 31K. Therefore, the channel control unit 13 may recognize the target volume 11T and its control table (namely, the target control table) 31T from the ID of the target volume that is registered in the starting control table 31K and may check if the cache is hit with reference to the control table 31T (S39).

As a result of S39, if the cache is not hit (N at S40), the channel control unit 13 may secure the cache slot 21 dedicated to the target volume 11T on the cache memory 15, and it may register the cache pointer of this cache slot 21 in the target control table 31T (S41). After that, the channel control unit 13 may require the host 1 for cutting the communication (S42). Thereby, the communication may be cut between the host 1 and the disk array apparatus 3 by the host 1.

After S42, as shown in FIG. 8, if the disk control unit 19 corresponding to the physical disk group 9 having the target volume 11T prepared therein detects that the cache pointer or the like is newly registered in the target control table 31T, this disk control unit 19 may read the data from the access address (namely, the access address of the target volume 11T) registered in that target control table 31T; and then, it may store that read data in the cache slot 21 indicated by the cache pointer that is registered in the target control table 31T (S44). Then, the disk control unit 19 may inform the channel control unit 13 of completion of data preparation meaning that the read data is stored in the cache slot 21 of the target volume 11T (S45).

Upon receiving the notice of completion of data preparation from the disk control unit 19, the channel control unit 13 may request the host 1 that is requested to cut the certain communication channel at S37 in FIG. 7 for reconnection (S46).

Upon receiving request of reconnection from the channel control unit 13, the host OS 7 may reconnect to the disk array apparatus 3 and may transmit again the second sub command 19B that was transmitted in advance. Therefore, the above-described processing from S31 to S34 and S39 may be carried out.

Since the cache pointer is registered in the target control table 31T at S41, in this time, the cache is hit at S39 (Y at S40). In this case, the channel control unit 13 may read the above-described stored read data from the cache slot 21 that is cache-hit (namely, the cache slot 21 indicated by the cache pointer registered in the target control table 31T) and transmit it to the host 1. Further, the channel control unit 13 may inform the host 1 of normal status indicating that the read processing is normally carried out and may ease record on the starting control table 31K and the target control table 31T (for example, a cache pointer, an access address, and an access class or the like) (S43).

The flow of the read control is as described above.

(3) A Write Control Case (Namely, a Case of Writing the Data in the Volume 11T Other than the Starting Volume 11K)

In this case, at first, as shown in FIG. 7, as same as the normal read case, the processing from S31 to S32 may be carried out. Then, in this case, as a result of S32, it is detected that the second access class code carried by the second sub command 19B indicates write.

Figure 9:
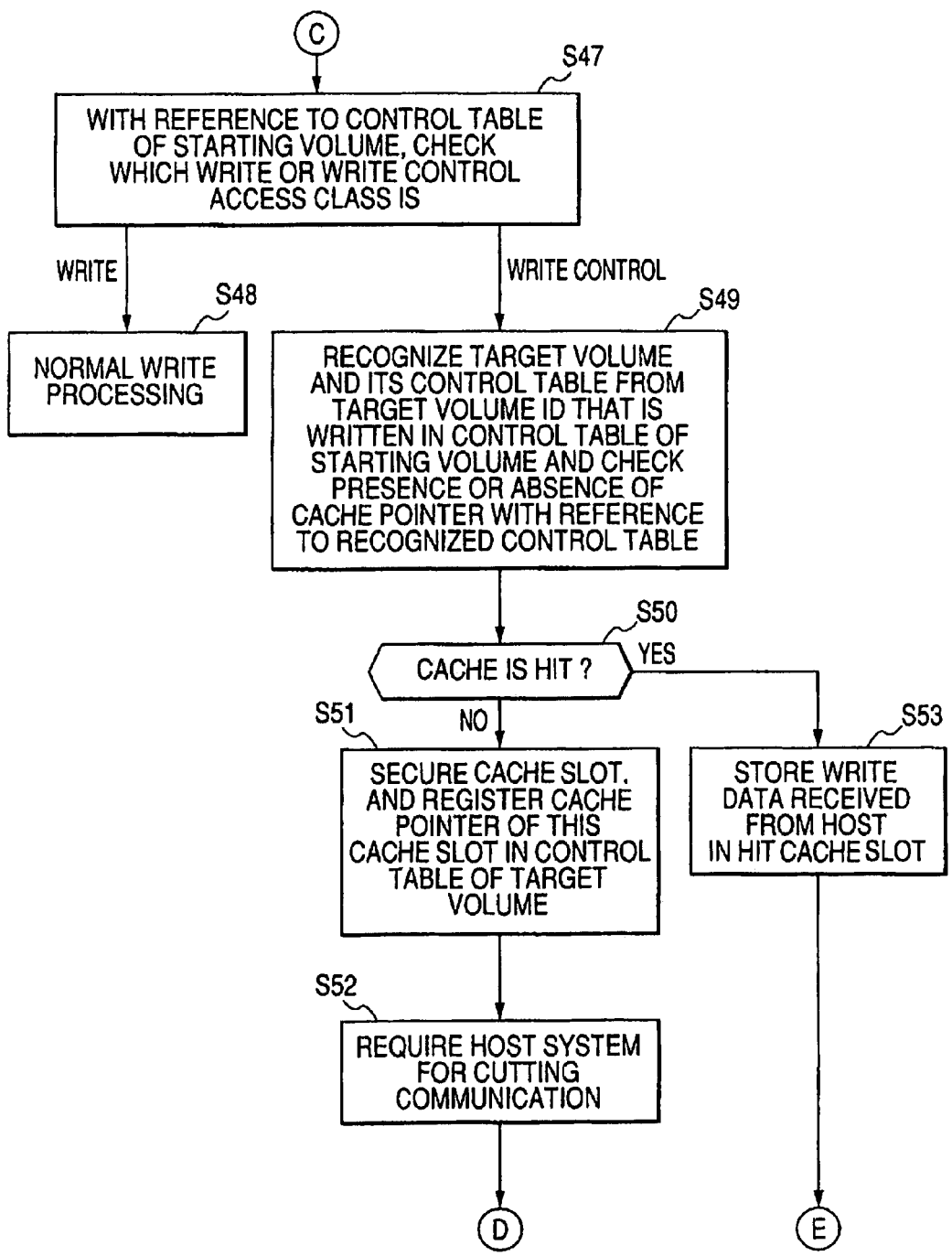
FIG. 9 shows a flow of the operation of the disk array apparatus 3 when receiving the second sub command 19B from the host 1.

After that, as shown in FIG. 9, the channel control unit 13 may confirm which write or write control is registered as the access class with reference to the starting control table 31K of the starting volume 11K as a target of the second sub command 19B (S47).

As a result of S47, if write control is registered, the channel control unit 13 may recognize the target volume 11T and its control table 31T from the ID of the target volume that is registered in the starting control table 31K and may confirm if the cache is hit with reference to this recognized control table 31T (S49).

As a result of S49, if the cache is not hit (N at S50), the channel control unit 13 may secure the cache slot 21 dedicated to the target volume 11T on the cache memory 15; and may register the cache pointer of that cache slot 21 in the target control table 31T (S51). After that, the channel control unit 13 may require the host 1 for cutting (S52).

Figure 10:
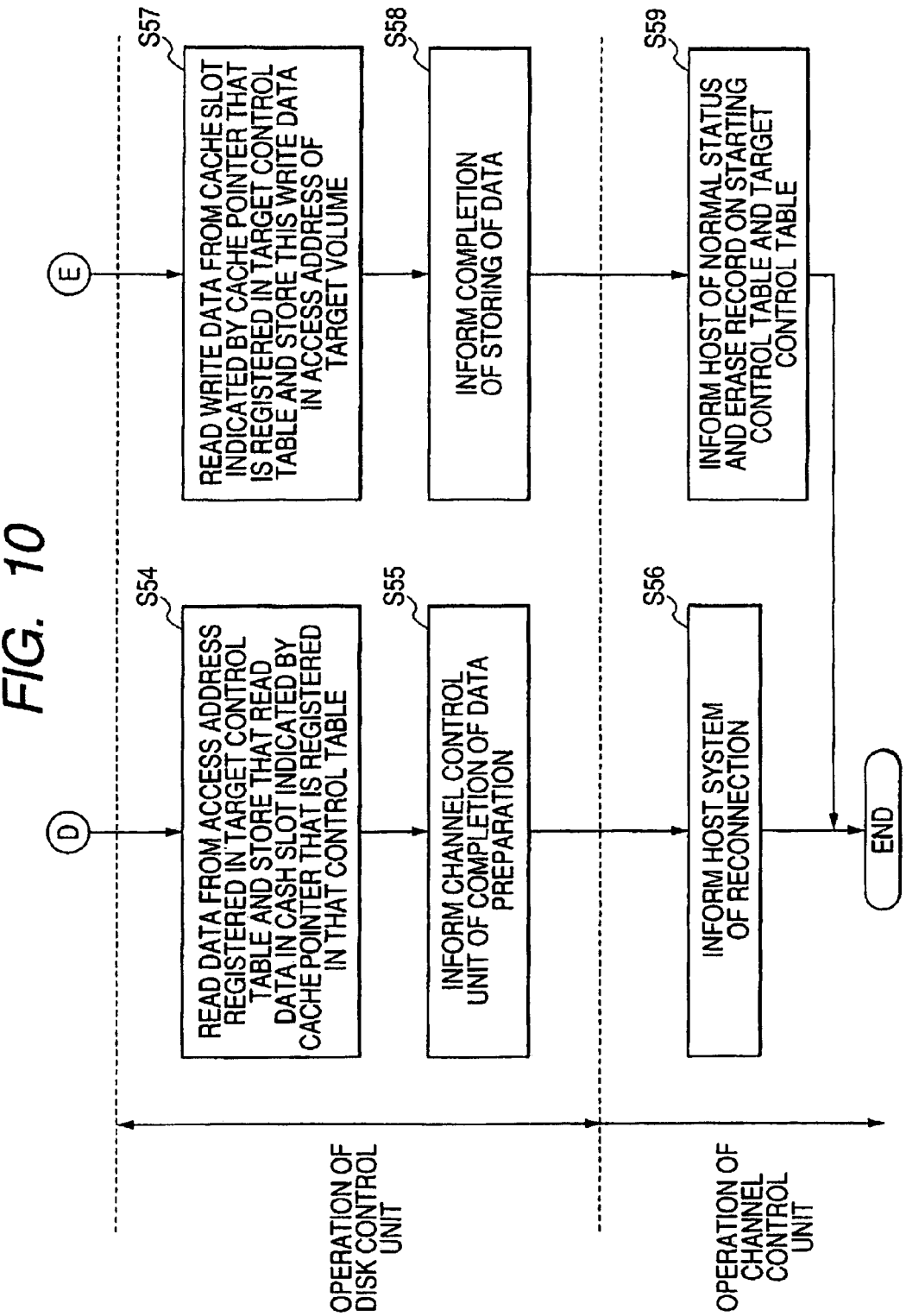
FIG. 10 shows a flow of the operation of the disk array apparatus 3 when receiving the second sub command 19B from the host 1.

As shown in FIG. 10, after S52, if the disk control unit 19 corresponding to the physical disk group 9 having the target volume 11T prepared therein detects that the cache pointer or the like is newly registered in the target control table 31T, this disk control unit 19 may read the data from the access address (namely, the access address of the target volume 11T) registered in that target control table 31T; and then, it may store that read data in the cache slot 21 indicated by the cache pointer that is registered in the target control table 31T (S54). Then, the disk control unit 19 may inform the channel control unit 13 of completion of data preparation (S55).

Upon receiving a notice of completion of data preparation from the disk control unit 19, the channel control unit 13 may request the host 1 that is requested to cut the certain communication channel at S52 in FIG. 9 for reconnection (S56).

Upon receiving request of reconnection from the channel control unit 13, the host OS 7 may reconnect to the disk array apparatus 3 and may transmit again the second sub command 19B that was transmitted in advance. Therefore, the above-described processing from S31 to S32, S47 and S49 may be carried out.

Since the cache pointer is registered in the starting target table 31T at S51, in this time, the cache is hit at S49 (Y at S50). In this case, the channel control unit 13 may store the write data included in the received second sub command 19B in the cache-hit cache slot 21 (namely, the cache slot 21 indicated by the cache pointer registered in the target control table 31T) (S53).

After S53, as shown in FIG. 10, detecting that there is the write data in the cache slot 21 indicated by the cache pointer that is registered in the in the starting target table 31T, the disk control unit 19 may read this write data and then, may write it in the access address (namely, the access address of the target volume 11T) that is registered in the target control table 31T. After that, the disk control unit 19 may inform the channel control unit 13 of completion of storing the write data (S58).

Receiving the notice of completion of storing the write data, the channel control unit 13 may inform the host 1 of normal status indicating that the write processing is normally carried out, and further, it may erase record on the starting control table 31K and the target control table 31T (for example, the cache pointer, the access address, and the access class or the like) (S59).

The operational flow of the write control is as described above.

(4) A Normal Write Case (Namely, a Case of Writing the Data in the Starting Volume 11K)

In this case, as same as the case of the write control, at first, the processing at S31 to S32 and S47 may be carried out. Then, in this case, as a result of S47, it is detected that the write is registered in the starting control table 31K, so that the normal write processing is carried out (S48). The flow of the normal write processing is not illustrated particularly, however, a person skilled in the art may comprehend that the normal write processing is carried out in the following flow from the above description with respect the operational flow in the case of the normal read, the read control, and the write control.

In other words, with reference to the starting control table 31K, the channel control unit 13 may confirm if the cache is hit. As a result, if the cache is not hit, the channel control unit 13 may secure the cache slot 21 dedicated to the starting volume 11K on the cache memory 15; and may register the cache pointer of that cache slot 21 in the starting control table 31K. After that, the channel control unit 13 may require the host 1 for cutting the communication.

If the disk control unit 19 corresponding to the physical disk group 9 having the starting volume 11K prepared therein detects that the cache pointer or the like is newly registered in the starting control table 31K, this disk control unit 19 may read the data from the access address registered in that starting control table 31K; and then, it may store that read data in the cache slot 21 indicated by the cache pointer that is registered in the starting control table 31K. Then, the disk control unit 19 may inform the channel control unit 13 of completion of data preparation.

The channel control unit 13 may require the host 1 for reconnection when receiving the notice of completion of data preparation from the disk control unit 19.

Upon receiving request of reconnection from the channel control unit 13, the host OS 7 may reconnect to the disk array apparatus 3 and may transmit again the second sub command 19B that was transmitted in advance. Therefore, it is confirmed if the cache is hit.

In the above confirmation, since the cache pointer is registered in the starting control table 31K as described above, the cache is hit. In this case, the channel control unit 13 may store the write data included in the above-described received second sub command 19B in the cache slot 21 wherein the cache is hit.

After that, the disk control unit 19 may detect the existence of the write data in the cache slot 21 indicated by the cache pointer that is registered in the starting control table 31K, may read it, and then, may write it in the access address that is registered in the starting control table 31K (namely, the access address of the starting volume 11K). After that, this disk control unit 19 may inform the channel control unit 13 of completion of storing the write data.

Upon receiving the notice indicating that the storage of the write data has been completed, the channel control unit 13 may inform the host 1 of normal status indicating that the write processing is normally carried out and may erase record on the starting control table 31K.

The operational flow of the normal write is as described above.

According to the above-described embodiment, the host 1 transmits the access command 19 to the starting volume (namely, the logical volume as a target of that command 19) 11K. In this case, the host 1 may transmit the target information for the logical volume 11 of the target to be accessed, which target information is included in the access command 19. Even when the disk array apparatus 3 receives the access command 19 and the target volume indicated by the target information that is included in that access command 19 is different from the starting volume 11K, the disk array apparatus 3 may read the data from the volume 11T that is different from the starting volume 11K and offer it to the host 1, or it may write the data that the host 1 wants to write in the other volume 11T. Thus, according to this embodiment, in the same method as that for data accessing to the starting volume in the online state, it is possible to perform the data access for the other target volume. Therefore, it is convenient for a user. This is more convenient particularly when the target volume is an offline volume.

By the way, in the above description, it is not specifically explained how the host AP5 informs the host OS7 of the target volume, however, there are some methods for this. As an example, a method is conceivable such that the user performs a certain operation directly or by remote control to the disk array apparatus 3 in advance so as to make the disk array apparatus 3 to inform what data are stored in all logical volume and each logical volume carried by the disk array apparatus 3 (hereinafter, referred to as "the volume information"); and on the basis of this informed volume information, a desired target volume is inputted in the host AP5 and the host AP5 informs the target volume to the host OS7. As another example, a method is also conceivable such that the disk array apparatus 3 spontaneously transmits the volume information to the host 1 in response to the request from the user or at arbitrary timing and the host 1 stores that volume information in a predetermined storage area; and when the user operates the host AP5 and inputs the target volume, the host AP5 reads that volume information, displays it on a display, and informs the host OS7 of the logical volume that is selected by the user as a target volume.

In addition, the starting volume 11K is automatically selected by the host 1 or the disk array apparatus 3; or is arbitrarily selected by the user, for example, from among a plurality of online volumes in the online state to the host 1.

By the way, the above-described embodiment may include some applications, for example, the following first to third applications.

Figure 11:
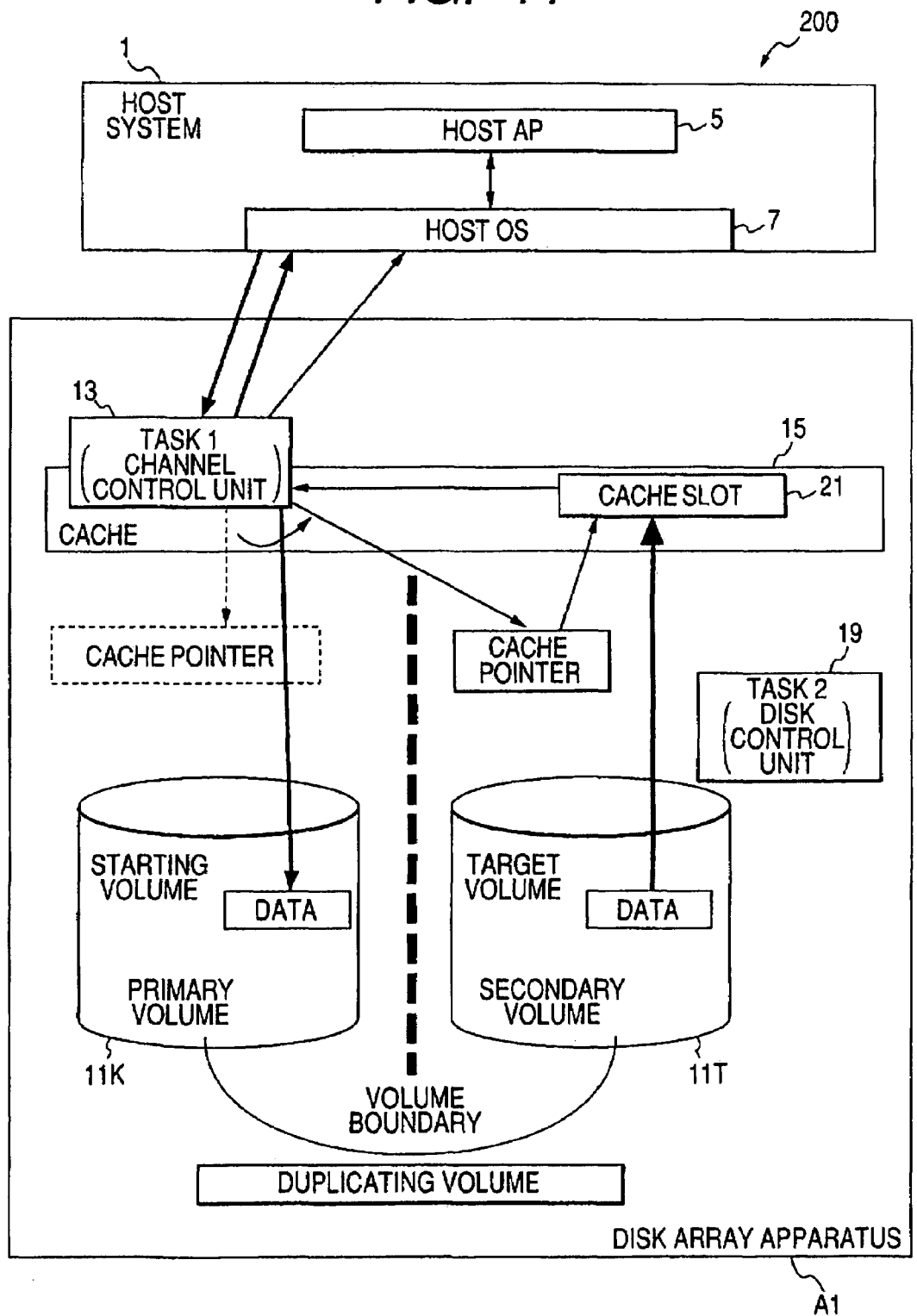
FIG. 11 shows a first application of the access system according to an embodiment of the present invention.

FIG. 11 shows a first application of an access system according to an embodiment of the present invention.

In the first application, the above-described embodiment is applied to a data access system 200 having a disk array apparatus A1 capable of performing duplicating processing by managing the primary volume and the secondary volume in a pair state.

According to this first application, the starting volume 11K is a primary volume, and the target volume 11T that is different from the starting volume 11K (for example, an offline volume) is a secondary volume.

According to this first application, only the primary volume 11K is in the online state to the host 1, and even if the secondary volume 11T is in the offline state, the host 1 can make the data access to the secondary volume 11T due to the same method as that of making the data access to the primary volume 11K. Specifically, as shown in the drawings, even if the host 1 issues an access command 19 targeting the primary volume 11K, the host 1 can obtain the desired data from the secondary volume 11T by including a first access class code indicating read control and the target information including the ID and the access address of the secondary volume 11T in that access command 19. In addition, even if the host 1 issues an access command 19 targeting the primary volume 11K, the host 1 can write the desired data in the secondary volume 11T by including the first access class code indicating write control and the target information including the ID and the access address of the secondary volume 11T in that access command 19.

Further, in this first application, for example, when the first data in the primary volume 11K and the second data in the secondary volume 11T (it pairs with the first data) are not identical with each other, the disk array apparatus 3 may read the second data from the secondary volume 11T and write that second data over the first data in the primary volume 11K so as to make it possible to recover the first data. This processing may be automatically performed, for example, when the disk array apparatus 3 compares the first data with the second data at arbitrary timing and they are not identical with each other. Alternatively, informing the host 1 of the above-described discordance, the host 1 may transmit the access command 19 targeting the second data of the secondary volume 11T by using the primary volume 11K as the starting volume in the response to the request from the user or spontaneously and the disk array apparatus 3 may perform the overwrite processing on the basis of that command 19 from the host 1.

Figure 12:
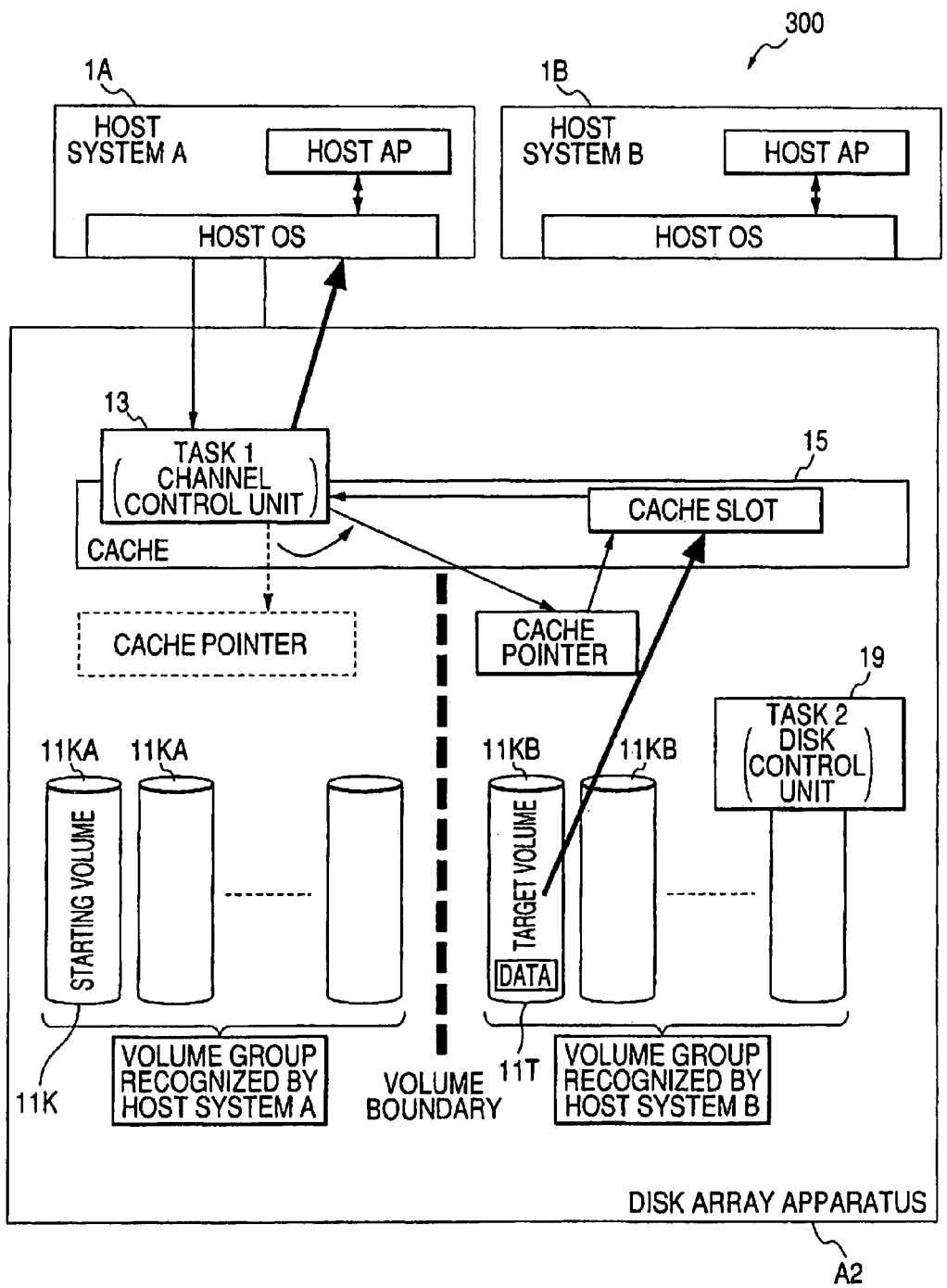
FIG. 12 shows a second application of the access system according to an embodiment of the present invention.

FIG. 12 illustrates a second application of the access system according to an embodiment of the present invention.

In the second application, the above-described embodiment is applied to a data access system 300 having a plurality of hosts 1A and 1B, and a disk array apparatus A2 to be connected to these plural hosts 1A and 1B with allowed for communication thereto.

According to this second application, the starting volume 11K for the host 1A is one logical volume that is selected automatically or manually from among one or plural online volumes 11KA that is or are in the online state to the host 1A. On the other hand, the target volume 11T for the host 1A (for example, an offline volume) is the logical volume that is designated by the host 1A from among one or plural online volumes 11KB that are not in the online state to the host 1A but are in the online state to the other host 1B.

According to this second application, the host 1A can make the data access to a logical volume 11KB that is in the online state to the other host 1B due to the same method as that of making the data access to the starting volume 11K that is in the online state to its own device. In other words, if the logical volume is assigned to each of the hosts 1A and 1B, each of the hosts 1A and 1B can make the data access to the logical volume that is assigned to the other host due to the same method as that of making the data access to the online volume that is assigned to their own device. Therefore, the hosts 1A and 1B can make the data access to the online volume (or the offline volume) that is assigned to the other host due to the same method as that of making the data access to the online volume that is assigned to their own devices even if the hosts 1A an 1B have the different host classes (for example, a manufacture of the host and a class of the OS of the host) and the data formats of logical volumes 11KA and 11KB recognized by the hosts 1A and 1B, respectively, are different.

Figure 13:
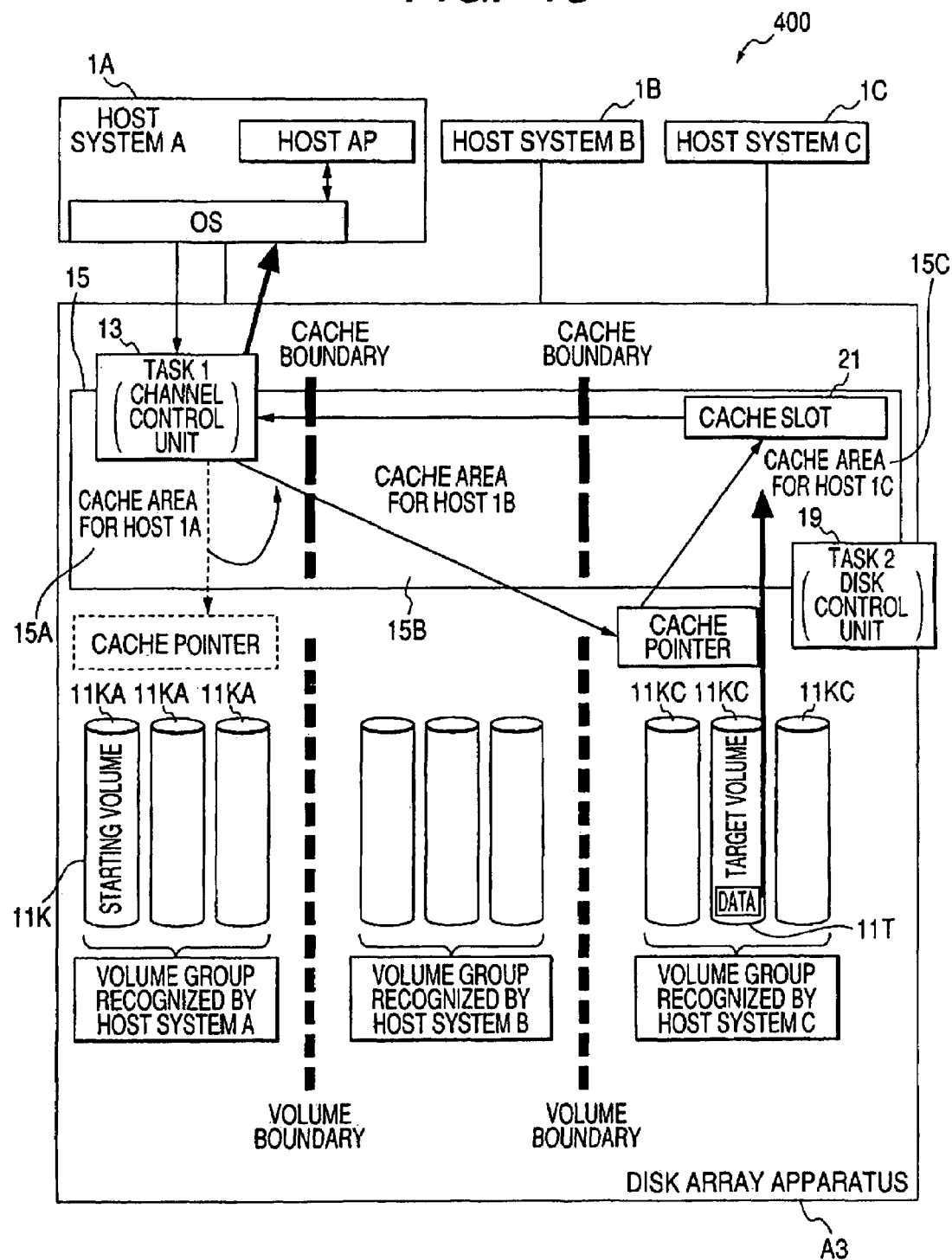
FIG. 13 shows a third application of the access system according to an embodiment of the present invention.

FIG. 13 shows a third application of the access system according to an embodiment of the present invention.

The third application is a modification of the above-described second application and this third application is applied to a data access system 400 having a plurality of hosts 1A, 1B and 1C and a disk array apparatus A3 to be connected to these plural hosts 1A, 1B and 1C with allowed for communication thereto.

According to this third application, the storage area of the cache memory 15 of the disk array apparatus A3 is partitioned for each host. Specifically, the cache memory 15 has three cache areas, namely, a first cache area 15A assigned to the first host 1A, a second cache area 15B assigned to the second host 1B, and a third cache area 15C assigned to the third host 1C.

According to this third application, as same as the second application, the starting volume 11K for the host 1A is one logical volume that is selected automatically or manually from among one or plural online volumes 11KA that is or are in the online state to the host 1A. On the other hand, the target volume 11T for the host 1A (for example, the offline volume) is the logical volume that is designated by the host 1A from among one or plural online volumes 11KC that are not in the online state to the host 1A but are in the online state to the other host 1C.

According to this third application, receiving the access command 19 from the host 1A, the channel control unit 13 may secure the cache slot 21 in the cache memory 15C of a third host 1C since the target information included in the command 19 indicates one online volume 11KC in the third host 1C, and at the same time, the channel control unit 13 may fill the cache pointer of that cache slot 21 in the control table corresponding to that online volume 11KC.

According to this third application, when the cache area is assigned to each host, if the host 1A makes the data access to the online volume 11KC of the other host 1C, the channel control unit 13 communicating with the host 1A may secure the cache slot 21 not in the cache area 15A corresponding to the host 1A but in the cache area 15C of the other host 1C that is in the online state to the target volume 11T of the host 1A so that the data is exchanged between the host 1A and the online volume to the other host 1C via the cache slot 21. In other words, even if the cache area is assigned to each host, each of the hosts 1A, 1B and 1C can make the data access to the online volume (or the offline volume) that is assigned to the other host due to the same method as that of making the data access to the online volume that is assigned to their own devices.

The preferable embodiment according to the present invention and its applications are described as above, however, they are exemplified to explain the present invention but not to limit a scope of the present invention only to this embodiment and the applications. The present invention can be practiced by other various figurations. For example, a plurality of the disk array apparatuses 3 may be possible. In this case, the starting volume 11K of the host 1 is located in the first disk array apparatus that is connected to the host 1, and the target volume 11T of the host 1 may be located in the second disk array apparatus that is different from the first disk array apparatus. In this case, the host 1 can make the data access to the logical volume in the other disk array apparatus due to the same method as that of making the data access to a desired starting volume in the disk array apparatus to which its own device is connected.

What is claimed is:

1. A data access system having a storage system and a host device that is connected to said storage system with allowed for communication thereto:
   wherein said storage system comprises physical or logical plural data storage areas including an online storage area that is in an online state to said host device; and an access control means enabling said host device to access a target storage area, which is a data storage area other than said online storage area and is a target that said host device wants to access, through said desired or predetermined online storage area,
   wherein said access control means comprises a host communication means as a communication interface to said host device, a storage area communication means for accessing said plural data storage areas, and a cache memory for transferring the read data that is read from said data storage area or the write data that is received from said host device between said host communication means and said storage area communication means;
   said cache memory secures a cache slot, which is a storage area for temporarily storing said read data or said write data, therein;
   said cache slot is provided with dedicated to one data storage area; and
   upon receiving the access request to said desired online storage area from said host device, said host communication means secures a cache slot for target that is dedicated not to said desired online storage area but to a target storage area that is designated by the target information that is carried by said received access request on said cache memory; and thereby, the read data that is read from said target storage area or the write data to be written in said target storage area is temporarily stored in said secured cache slot for target.

2. A data access system having a storage system and a host device that is connected to said storage system with allowed for communication thereto:
   wherein said storage system comprises physical or logical plural data storage areas including an online storage area that is in an online state to said host device; and an access control means enabling said host device to access a target storage area, which is a data storage area other than said online storage area and is a target that said host device wants to access, through said desired or predetermined online storage area,
   wherein said access control means comprises a host communication means as a communication interface for said host device, a storage area communication means for accessing said plural data storage areas, and an access control table for controlling the access to said plural data storage areas;
   said access control table can record therein the access target information indicating what data storage area said host device accesses;
   upon receiving said access request from said host device, said host communication means registers said target storage area that is designated by the target information that is carried by said received access request as said access target information in said access control table; and
   said storage area communication means reads the data from said target storage area on the basis of said access target information that is registered in said access control table so as to transmit this read data from said host communication means to said host device or said storage area communication means writes the write data, which is received by said host communication means from said host device, in said target storage area.

3. A data access system having a storage system and a host device that is connected to said storage system with allowed for communication thereto:
   wherein said storage system comprises physical or logical plural data storage areas including an online storage area that is in an online state to said host device; and an access control means enabling said host device to access a target storage area, which is a data storage area other than said online storage area and is a target that said host device wants to access, through said desired or predetermined online storage area,
   wherein said host device has an access request means for transmitting the access request including target information designating said target storage area to said storage system as the access request to said desired online storage area; and said access control means receives the access request to said desired online storage area from said host device, reads the data from said target storage area on the basis of the target information that is carried by that access request and offers this read data to said host device or said access control means receives the data from said host device and writes this received data in said target storage area,
   wherein the access request transmitted by said host device includes a first sub access request and a second sub access request;
   said first sub access request is the request to said desired online storage area and it includes said target information;
   said second sub access request is also the request to said desired online storage area and it includes read/write information indicating which read or write of the data should be carried out; and
   said access control means performs read/write preparation processing on the basis of said target information by receiving said first sub access request before said second access request, and consequently, said access control means performs read or write of the data to the target storage area that is designated by said target information by receiving said second sub access request.

4. A data access system according to claims 1 or 3, wherein said read/write preparation processing includes securing said cache slot on said cache memory by said host communication means.

5. A data access system according to claim 1, wherein, in the case that a first host device and a second host device are connected to said storage system with allowed for communication thereto; said cache memory prepares an area for a first host as a cache area for a first host device and an area for a second host as a cache area for a second host device;
   said target storage area for said first host device includes a second host online storage area that is in the online state to said second host device; and
   upon receiving the access request having the target information with said second host online storage area as the target storage area from said first host device, said host communication means secures said cache slot for said second host online storage area in said area for said second host on said cache memory.

6. A host device capable of being connected to a storage system having physical or logical plural data storage areas with allowed for communication thereto, wherein, in the case that said plural data storage areas include an online storage area that is in the online state to said host device; said host device comprises a means for accessing a target storage area, which is a data storage area other than said online storage area and is a target that said host device wants to access, through said desired or predetermined online storage area, comprising:

online/offline identification information indicating if each data storage area is in the online state or in the offline state to said host device;

a control means for identifying if each data storage area is in the online state or in the offline state on the basis of said online/offline identification information, and said control means performs said access request means when it is in the online state and outputs an error when it is in the offline state; and an information update means; wherein, if said target storage area is the offline storage area, said information update means updates said online/offline identification information and makes the state of that target storage area into the online state so as to identify the online state of the target storage area for said control means;

wherein said control means operates on the basis of said online/offline identification information that is updated by said information update means.

* * * * *